US008740305B2

(12) United States Patent
Greenwood

(10) Patent No.: US 8,740,305 B2
(45) Date of Patent: * Jun. 3, 2014

(54) SOLDIER PLATFORM SYSTEM

(75) Inventor: Kyle L. Greenwood, Bryan, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,389

(22) Filed: Jul. 16, 2012

(65) Prior Publication Data

US 2013/0181495 A1    Jul. 18, 2013

Related U.S. Application Data

(63) Continuation of application No. 13/191,904, filed on Jul. 27, 2011, now Pat. No. 8,240,767, which is a continuation of application No. 12/246,471, filed on Oct. 6, 2008, now Pat. No. 8,011,730.

(51) Int. Cl.
*A47C 1/00* (2006.01)
*A62B 35/00* (2006.01)
*B60R 22/00* (2006.01)

(52) U.S. Cl.
USPC ....... 297/344.18; 297/311; 297/465; 297/468

(58) Field of Classification Search
USPC ........ 297/344.12, 344.18, 465, 474, 475, 486
See application file for complete search history.

(56) References Cited

U.S. PATENT DOCUMENTS

| | | | |
|---|---|---|---|
| 228,518 A * | 6/1880 | Dawes | 108/147 |
| 1,518,600 A | 12/1924 | Nolen | |
| 2,527,905 A * | 10/1950 | Barecki | 248/421 |
| 2,556,076 A | 6/1951 | Evans et al. | |
| 2,829,702 A | 4/1958 | Keating | |
| 2,834,401 A | 5/1958 | Tanner | |
| 2,859,063 A * | 11/1958 | Underland | 296/65.02 |
| 3,184,205 A * | 5/1965 | Carpezzi | 248/352 |
| 3,314,720 A | 4/1967 | Millington et. al. | |
| 3,625,563 A * | 12/1971 | Dickinson et al. | 297/333 |
| 3,653,715 A | 4/1972 | Drabert et al. | |
| 3,659,844 A | 5/1972 | Cummins | |

(Continued)

FOREIGN PATENT DOCUMENTS

| | | |
|---|---|---|
| GB | 2406078 | 3/2005 |
| WO | 2006022880 | 3/2006 |

OTHER PUBLICATIONS

PCT International Search Report for International Application No. PCT/US09/59471 dated Mar. 8, 2010.

(Continued)

*Primary Examiner* — Philip Gabler
(74) *Attorney, Agent, or Firm* — Tumey L.L.P.

(57) ABSTRACT

A soldier platform system and method includes a soldier platform system in a vehicle. In an embodiment, the soldier platform system includes a soldier platform system in a vehicle. The soldier platform system includes a seat assembly comprising a seat and straps. The straps are attachable to the vehicle. In addition, the soldier platform system includes a restraint harness belt. The restraint harness belt is attached to the seat assembly. The soldier platform system also includes a ratchet platform. The ratchet platform includes a platform upper assembly and a platform lower assembly. The platform lower assembly comprises a platform upper assembly actuator. The platform upper assembly actuator comprises a pedal sub assembly.

20 Claims, 24 Drawing Sheets

(56) References Cited

U.S. PATENT DOCUMENTS

| | | | |
|---|---|---|---|
| 3,868,143 A * | 2/1975 | Reilly | 297/216.17 |
| 3,954,041 A * | 5/1976 | Mechulam et al. | 89/36.13 |
| 4,099,778 A | 7/1978 | Lehr | |
| 4,139,215 A | 2/1979 | Guitard et al. | |
| 4,474,347 A | 10/1984 | Mazelsky | |
| 4,602,816 A | 7/1986 | Chandler | |
| 4,738,413 A | 4/1988 | Spinosa et al. | |
| 4,822,224 A | 4/1989 | Carl et al. | |
| 4,856,747 A | 8/1989 | Gano | |
| 4,923,147 A | 5/1990 | Adams et al. | |
| 5,010,850 A | 4/1991 | Sailer | |
| 5,039,054 A | 8/1991 | Pai | |
| 5,176,402 A | 1/1993 | Coulon | |
| 5,180,131 A | 1/1993 | Few | |
| 5,259,478 A | 11/1993 | Berish et al. | |
| 5,533,934 A | 7/1996 | Miller | |
| 5,577,806 A | 11/1996 | Ugalde | |
| 5,839,965 A | 11/1998 | Mullins | |
| 6,142,567 A | 11/2000 | Bentley | |
| D439,062 S | 3/2001 | McGinnis et al. | |
| 6,409,243 B1 | 6/2002 | Hansen | |
| 6,467,576 B2 * | 10/2002 | Figura et al. | 182/63.1 |
| 6,481,777 B2 * | 11/2002 | Mans | 296/68.1 |
| 6,719,258 B2 * | 4/2004 | Bryngelson et al. | 248/419 |
| 6,725,855 B1 | 4/2004 | Brennan | |
| 6,913,314 B2 | 7/2005 | Hansen | |
| 7,100,991 B2 * | 9/2006 | Schroth | 297/468 |
| 7,175,233 B2 | 2/2007 | Greenwood et al. | |
| 7,290,742 B2 | 11/2007 | Wang | |
| 7,293,818 B2 | 11/2007 | Kumpf et al. | |
| 7,413,247 B2 | 8/2008 | Van Druff et al. | |
| 7,758,095 B2 | 7/2010 | Elhanany | |
| 7,815,255 B1 | 10/2010 | Kiel et al. | |
| 8,011,730 B2 * | 9/2011 | Greenwood | 297/344.18 |
| 8,240,767 B2 * | 8/2012 | Greenwood | 297/344.18 |
| 2004/0108165 A1 | 6/2004 | Poole et al. | |
| 2006/0097559 A1* | 5/2006 | Lewis | 297/353 |
| 2006/0207021 A1* | 9/2006 | Brunson et al. | 5/81.1 R |
| 2007/0096526 A1* | 5/2007 | Hentges | 297/344.12 |
| 2007/0281125 A1 | 12/2007 | Moore et al. | |
| 2010/0084897 A1 | 4/2010 | Greenwood | |
| 2010/0084907 A1 | 4/2010 | Greenwood et al. | |

OTHER PUBLICATIONS

PCT International Search Report for International Application No. PCT/US09/59469 dated Mar. 11, 2010.
PCT International Search Report for International Application No. PCT/US09/59470 dated Apr. 26, 2010.
USPTO Office action for U.S. Appl. No. 12/246,237 dated May 24, 2011.
USPTO Supplemental Notice of Allowability for U.S. Appl. No. 12/246,471 dated Jun. 8, 2011.
USPTO Notice of Allowance for U.S. Appl. No. 12/246,471 dated Apr. 27, 2011.
PCT International Preliminary Report on Patentability (Chapter 1) for International Application No. PCT/US2009/059469 dated Apr. 12, 2011.
PCT International Preliminary Report on Patentability (Chapter 1) for International Application No. PCT/US2009/059470 dated Apr. 12, 2011.
PCT International Preliminary Report on Patentability (Chapter 1) for International Application No. PCT/US2009/059471 dated Apr. 12, 2011.
USPTO Office Action for U.S. Appl. No. 12/246,237 dated Oct. 14, 2010.
USPTO Office Action for U.S. Appl. No. 12/246,471 dated Sep. 28, 2010.
USPTO Office Action for U.S. Appl. No. 12/245,861 dated Jun. 18, 2012.
USPTO Office Action for U.S. Appl. No. 13/191,904 dated Oct. 18, 2011.
Notice of Allowance for U.S. Appl. No. 12/246,237 dated Nov. 8, 2011.
USPTO Office Action for U.S. Appl. No. 12/245,861 dated Jun. 22, 2011.
USPTO Office Action for U.S. Appl. No. 12/245,861 dated Oct. 25, 2011.
USPTO Office Action for U.S. Appl. No. 12/245,861 dated Feb. 9, 2012.
EPO search report for Application No. 09819694.2 dated Apr. 23, 2012.
EPO Supplemental Search Report for Application No. 09819694.2 dated May 11, 2012.
USPTO Office Action for U.S. Appl. No. 12/245,861 dated Nov. 27, 2012.
USPTO Office Action for U.S. Appl. No. 13/368,773 dated Oct. 24, 2012.
Notice of Allowance for U.S. Appl. No. 13/191,904 dated Apr. 12, 2012.
European Search Report and Written Opinion for EU Application No. EP 09819695 dated Apr. 2, 2013.
Office Action for U.S. Appl. No. 13/191,899 dated Apr. 18, 2013.
Office Action for U.S. Appl. No. 13/191,899 dated Aug. 9, 2013.
Communication under Rule 71(3)—Intention to Grant—for EP Patent Application Serial No. 09819695.0 dated Nov. 26, 2013.

* cited by examiner

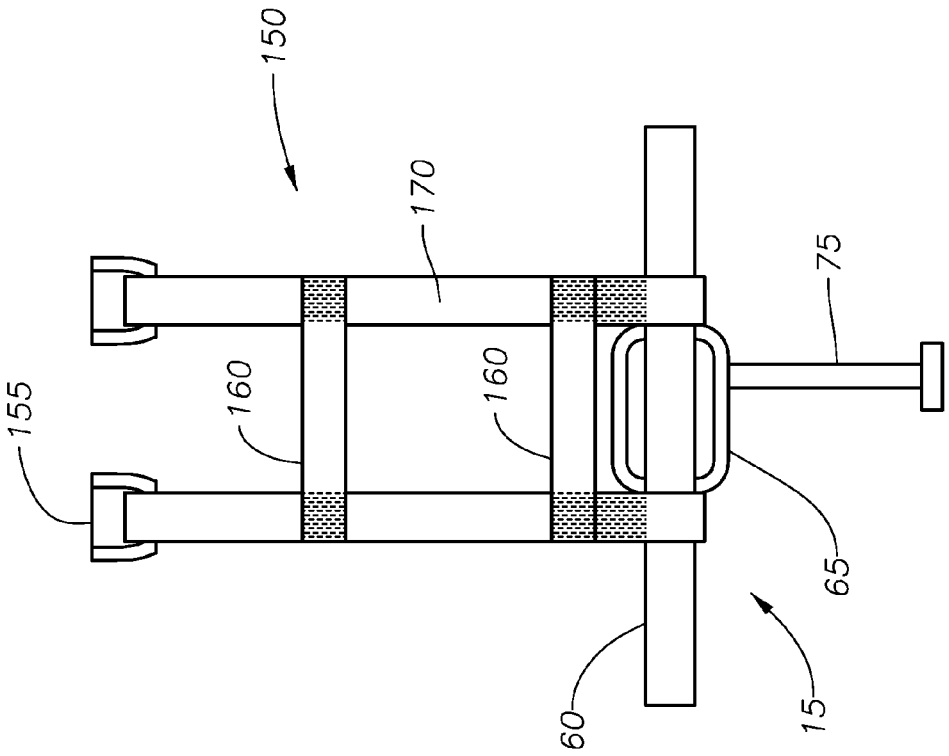
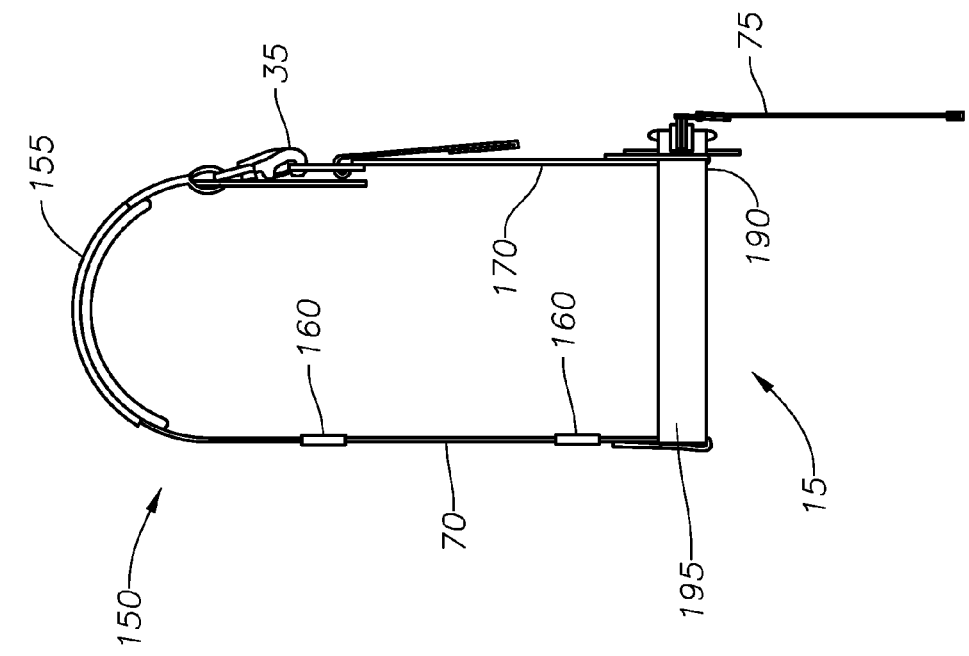

SOLDIER PLATFORM SYSTEM

CROSS-REFERENCE TO RELATED APPLICATIONS

This application is a continuation of U.S. application Ser. No. 13/191,904 filed Jul. 27, 2011, which is a continuation of U.S. application Ser. No. 12/246,471 filed Oct. 6, 2008 and now issued as U.S. Pat. No. 8,011,730, which are all herein incorporated by reference in their entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of restraint systems and more specifically to the field of adjustable height soldier restraint systems for use in a military vehicle.

2. Background of the Invention

Occupants of vehicles often need to be in an elevated position within the vehicle. For instance, in military vehicles, occupants of the military vehicles may need to expose the upper portion of the occupants' bodies outside of the vehicle. Such instances include the need to operate weaponry, improve vision outside of the military vehicle, and the like. Problems occur in such situations with fatigue involved with the individuals having to stand in such positions for long periods of time. Further problems include securing the occupant inside the vehicle during motion of the vehicle and also during a vehicle roll over to prevent injury of the occupant.

Consequently, there is a need for a restraint system to protect soldiers in a vehicle. Additional needs include an improved restraint system that secures an occupant in a vehicle and that also provides a seat to the occupant.

BRIEF SUMMARY OF SOME OF THE PREFERRED EMBODIMENTS

These and other needs in the art are addressed in one embodiment by a soldier platform system in a vehicle. The soldier platform system has a seat assembly comprising a seat and straps. The straps are attachable to the vehicle. The soldier platform system also has a restraint harness belt. The restraint harness belt is attached to the seat assembly. In addition, the soldier platform system has a ratchet platform. The ratchet platform includes a platform upper assembly and a platform lower assembly. The platform lower assembly comprises a platform upper assembly actuator, wherein the platform upper assembly actuator comprises a pedal sub assembly.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 11 illustrates a side view of a restraint harness belt and a shoulder harness;

FIG. 12 illustrates a back view of a restraint harness belt and a shoulder harness;

DETAILED DESCRIPTION OF THE PREFERRED EMBODIMENTS

Figure 1:
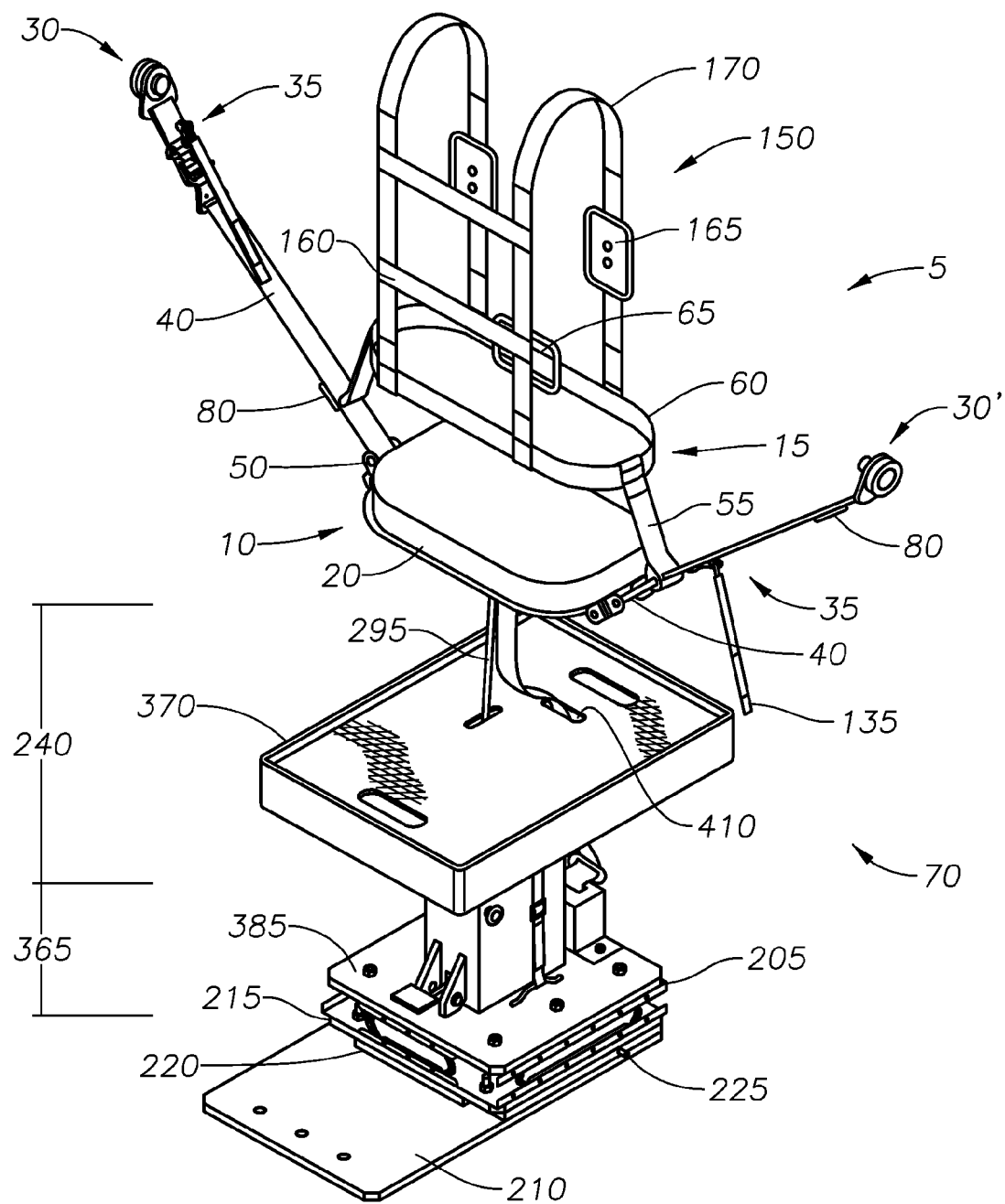
FIG. 1 illustrates a perspective view of a soldier platform system having a seat assembly, a restraint harness belt, a shoulder harness, a platform upper assembly, and a platform lower assembly.

FIG. 1 illustrates an embodiment of a soldier platform system 5 having a seat assembly 10, a restraint harness belt 15, and a ratchet platform 70, which includes a platform upper assembly 240 and a platform lower assembly 365. In some embodiments, soldier platform system 5 also includes a shoulder harness 150. In other embodiments, soldier platform system 5 includes energy attenuation system 205. Additional embodiments include soldier platform system 5 having a base plate 210 and a seat plate 215.

Figure 2:
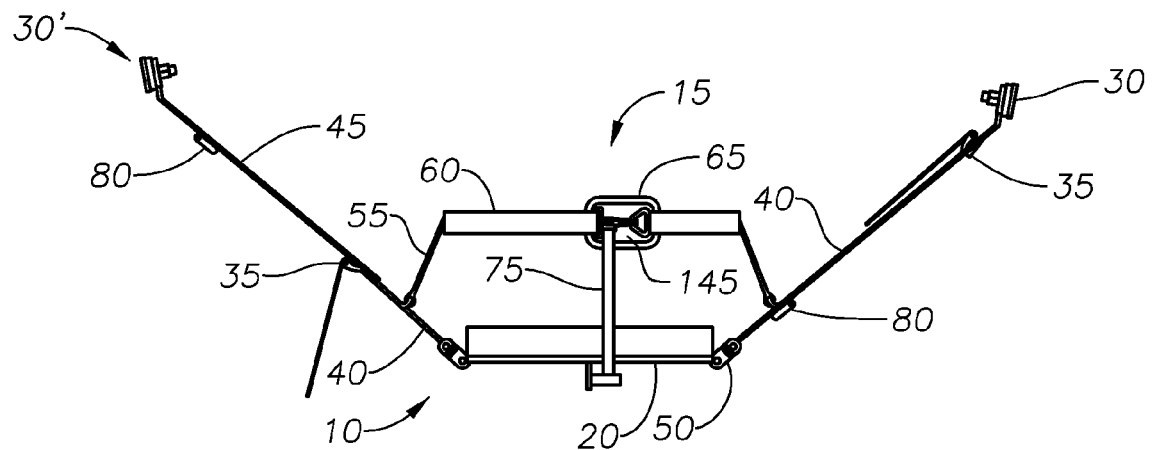
FIG. 2 illustrates a front view of a seat assembly and a restraint harness belt.
Figure 3:
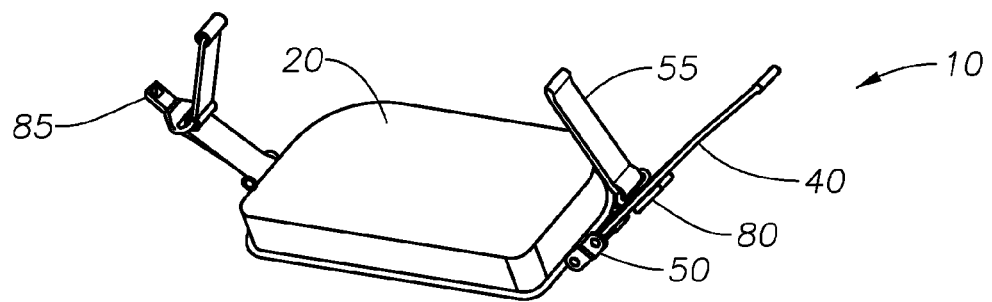
FIG. 3 illustrates a perspective view of a seat assembly.
Figure 4:
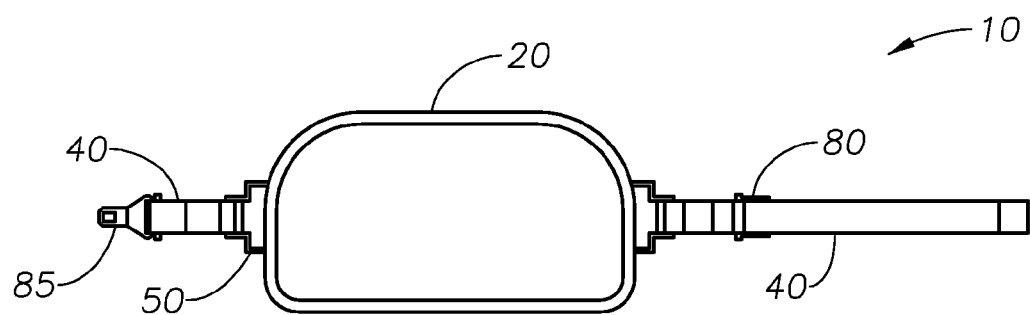
FIG. 4 illustrates a top view of a seat assembly.

FIG. 2 illustrates an embodiment of seat assembly 10 and restraint harness belt 15. As shown in FIGS. 1 and 2, seat assembly 10 includes seat 20. Seat 20 may include any type of seat suitable for use in a vehicle. Seat 20 may also be composed of any material suitable for use in a vehicle. Without limitation, seat 20 may be composed of leather, plastic, nylon, and the like. In some embodiments, seat 20 includes a cushion. FIG. 3 illustrates a perspective view of an embodiment of seat 20. Seat 20 may have any configuration suitable for an individual (i.e., soldier) to sit upon. FIG. 4 illustrates a top view of an embodiment of seat 20. As illustrated, straps 40 are attached to seat 20. Straps 40 are attached to seat 20 by strap attachment means 50. Strap attachment means 50 include any means suitable for attaching straps 40 to seat 20. In embodiments as illustrated in FIGS. 1-4, strap attachment means 50 are brackets that allow straps 40 and seat 20 to swivel in relation to each other. Straps 40 may be composed of any material suitable for use in a vehicle such as nylon, leather, and the like. In some embodiments, straps 40 are suitably attached on opposing sides of seat 20 to provide balance to an individual sitting in seat 20. In embodiments as illustrated in FIGS. 1-4, two straps 40 are attached to seat 20. In alternative embodiments (not illustrated), more than two straps 40 are attached to seat 20. Mounting assemblies 30, 30' attach soldier platform system 5 to the interior of the vehicle.

Figure 5:
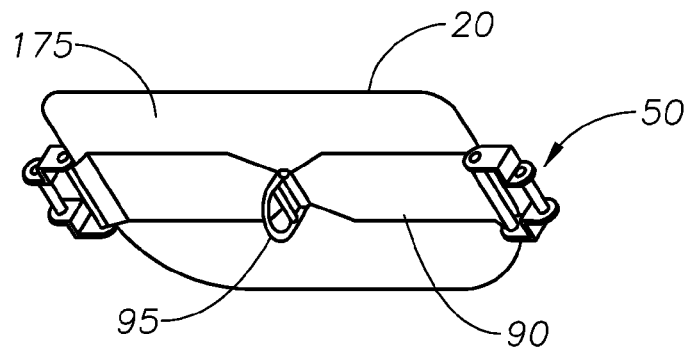
FIG. 5 illustrates a perspective bottom view of a seat assembly.

FIG. 5 illustrates a bottom perspective view of an embodiment of seat 20 in which seat 20 includes seat base strap 90. Seat base strap 90 includes base strap attachment means 95. Seat base strap 90 may be attached to bottom side 175 of seat 20 by any suitable means. In an embodiment as illustrated in FIG. 5, seat base strap 90 is attached to strap attachment means 50 and is disposed on bottom side 175. Base strap attachment means 95 includes any means suitable for securing seat 20 to platform lower assembly 365. In an embodiment, seat base strap 90 has sufficient tension between the strap attachment means 50 to provide contact between seat base strap 90 and bottom side 175 and to not substantially lose the contact when secured to platform lower assembly 365.

In an embodiment as illustrated in FIG. 2, mounting assemblies 30, 30' are secured inside the vehicle. In some embodiments, mounting assemblies 30, 30' are secured to inside surfaces such as walls of the vehicle or a gun turret of the vehicle. FIG. 2 illustrates an embodiment of soldier platform system 5 having mounting assemblies 30, 30' on opposing sides of seat 20. In embodiments as illustrated in FIG. 2, one mounting assembly 30 has an attached release assembly 35. The attached release assembly 35 is attached to a strap 40 that attaches mounting assembly 30 to seat 20. Strap 40 may be secured to seat 20 by any suitable means. In an embodiment as illustrated, strap 40 is secured to seat 20 by strap attachment means 50. Strap attachment means 50 includes any means suitable for attaching a strap to a seat. In an embodiment as shown, strap attachment means 50 is a bracket that swivels. Without limitation, a bracket that swivels allows limited motion of seat 20. In some embodiments, strap 40 includes adjusting means 80. Adjusting means 80 is any means suitable for adjusting the length of strap 40 between release assembly 35 and seat 20. The other mounting assembly 30' has an attached mounting strap 45 with a release assembly 35 attached on the opposing end of mounting strap 45 from mounting assembly 30'. In some embodiments, mounting strap 45 includes adjusting means 80. Seat 20 is attached to mounting assembly 30' by a strap 40 that attaches the release assembly 35 to seat 20. FIG. 2 illustrates an embodiment that has two mounting assemblies 30, 30' but it is to be understood that soldier platform system 5 is not limited to two mounting assemblies 30, 30' but in alternative embodiments (not illustrated) may have more than two mounting assemblies. Mounting assemblies 30, 30' are secured in the vehicle at a sufficient height to suspend seat 20 at a desirable height in the vehicle (i.e., from the floor or a platform in the vehicle). Adjusting means 80 allow the length of straps 40, 45 to be adjusted to adjust the suspension height of seat 20. Straps 40 attach seat 20 to release assemblies 35 by attachment means 85. Attachment means 85 may include any suitable means for attaching a strap to an object such as a hook, bracket, latch, and the like. Straps 40, 45 have a sufficient tension to facilitate suspension of seat 20 but in some embodiments also have a sufficient tension to allow the individual to have a desirable amount of movement while secured in seat 20. For instance, in an embodiment in which soldier platform system 5 is secured in the vehicle to allow the individual to sit in a gun turret of the vehicle, the soldier may have a desire to move about in the interior when operating a weapon in a combat situation or to view outside the vehicle. Mounting assemblies 30, 30' may be secured in the vehicle at any degrees apart to provide a seat 20 of sufficient stability to allow an individual to sit in seat 20.

FIGS. 1 and 2 illustrate an embodiment of soldier platform system 5 in which one mounting assembly 30 has a release assembly 35 attached to the mounting assembly 30, and the other mounting assembly 30' has a release assembly 35 attached with a mounting strap 45 attached in between the mounting assembly 30' and the release assembly 35. Without limitation, the mounting assembly 30 has the release assembly 35 attached to provide a release assembly 35 at a sufficient proximity to the individual sitting in seat 20 to allow the individual to pull the release assembly 35 and quickly drop seat 20. Further, without limitation, the mounting assembly 30' has the release assembly 35 at a lower position in relation to seat 20 to provide a release assembly 35 at a sufficient proximity to other individuals in the vehicle to pull the release assembly 35 and quickly drop seat 20. For instance, soldier platform system 5 may be mounted in a gun turret of the vehicle wherein the soldier secured in soldier platform system 5 has the upper portion of the soldier's body exposed outside of the vehicle. In a combat situation, the soldier secured in soldier platform system 5 may desire to quickly drop down in the vehicle for protection by the vehicle. In such a situation, the release assembly 35 attached to mounting assembly 30 provides a convenient release assembly 35 by which the soldier may pull and release seat 20, thereby allowing the soldier to drop into the vehicle for protection. The soldier may also pull the release assembly 35 attached to the mounting assembly 30' with the mounting strap 45 in between, but, with seat 20 in an elevated position allowing the soldier to be positioned in the gun turret, the position of such release assembly 35 provides a convenient release for other soldiers in the vehicle to pull and release seat 20 to allow the soldier to drop into the vehicle for protection. For instance, the soldier may be injured and unable to pull a release strap 135, and such lower positioned release strap 135 allows the other soldiers to pull the release strap 135 and thereby allow the injured soldier to be quickly protected inside the vehicle. It is to be understood that soldier platform system 5 is not limited to release assembly 35 attached to one mounting assembly 30 and another release assembly 35 disposed at a lower position in relation to seat 20. Soldier platform system 5 may have release assemblies 35 disposed at any position in relation to seat 20. In an alternative embodiment (not illustrated), a mounting assembly 30 and/or 30' may have one release assembly 35 attached to the respective mounting assembly and at least one other release assembly 35 disposed between the one release assembly 35 and seat 20. In other alternative embodiments (not illustrated), both mounting assemblies 30, 30' have a release assembly 35 attached to the respective mounting assembly 30, 30'. In some alternative embodiments (not illustrated), both mounting assemblies 30, 30' have an attached release assembly 35 with a mounting strap 45 disposed between the respective mounting assembly and the release assembly 35. It is to be understood that when one release assembly 35 is pulled to release seat 20 from the respective mounting assembly 30 or 30', seat 20 remains secured to the other mounting assembly 30 or 30', which protects the individual secured in soldier platform system 5 in the event of a roll over or injury from other motion of the vehicle.

Figure 6:
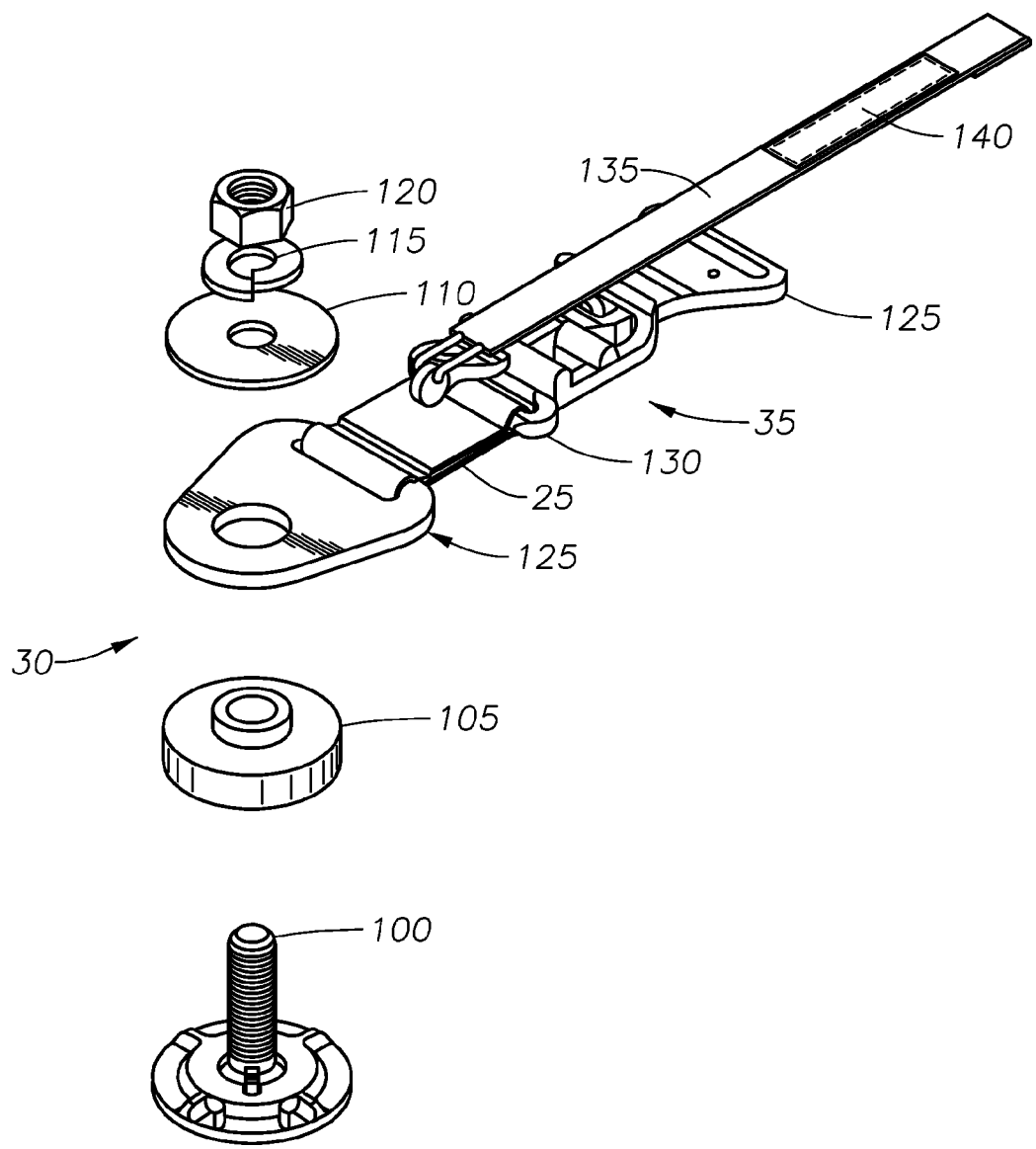
FIG. 6 illustrates a mounting assembly and a release assembly.

FIG. 6 illustrates an embodiment of a mounting assembly 30 with release assembly 35 attached. For illustration purposes only, mounting assembly 30 is shown in an exploded view. Mounting assembly 30 may include any suitable method for securing a strap to a wall. For instance, mounting assembly 30 may include nails, hooks, screws, adhesives, studs, magnets, and the like. In an embodiment as illustrated, mounting assembly 30 includes a bond stud 100, which secures bracket 125 of release assembly 35 within the vehicle. In an embodiment in which bond stud 100 secures bracket 125 to a steel surface inside the vehicle, the surface of the steel may be prepared and then bond stud 100 may be allowed to cure on the steel. In some embodiments, a bushing 105 slides over bond stud 100. Other embodiments also include mounting assembly 30 including other securing means such as washer 110, lock washer 115, and nut 120. Without limitation, with mounting assembly 30 including bond stud 100, the vehicle surface does not need to be welded or drilled to secure seat 20, which provides a reinforced substrate strength and facilitates corrosion resistance. Further, without limitation, welding or drilling on armor plate steel may compromise the integrity of the armor system.

As shown in FIG. 6, release assembly 35 includes latch and base release 130 and release strap 135. In the embodiment as shown, mounting assembly 30 secures release assembly 35 by securing bracket 125 to the vehicle, with the bracket 125 attached to latch and base release 130 by tether 25. Release assembly 35 has another bracket 125 on the opposing end of release assembly 35 to secure release assembly 35 to strap 40 (not illustrated). A sufficient pulling force applied to release strap 135 releases latch and base release 130, releasing strap 40 from mounting assembly 30. Without limitation, release assembly 35 provides a quick release mechanism. Strap 40 may be re-attached to mounting assembly 30 by re-connecting latch and base release 130 together. In an embodiment, release strap 135 has a reflector 140. Reflector 140 includes any reflective material that is suitable for attachment to a strap 40 and for use in a military vehicle. Without limitation, reflector 140 improves the visibility of release strap 135. It is to be understood that release assembly 35 is not limited to the embodiment illustrated in FIG. 6 but may include any other mechanisms suitable for allowing such a quick release. In an embodiment, release assembly 35 is a quick release mechanism of the type referred to as an ejector hook for use in the parachute industry.

Figure 7:
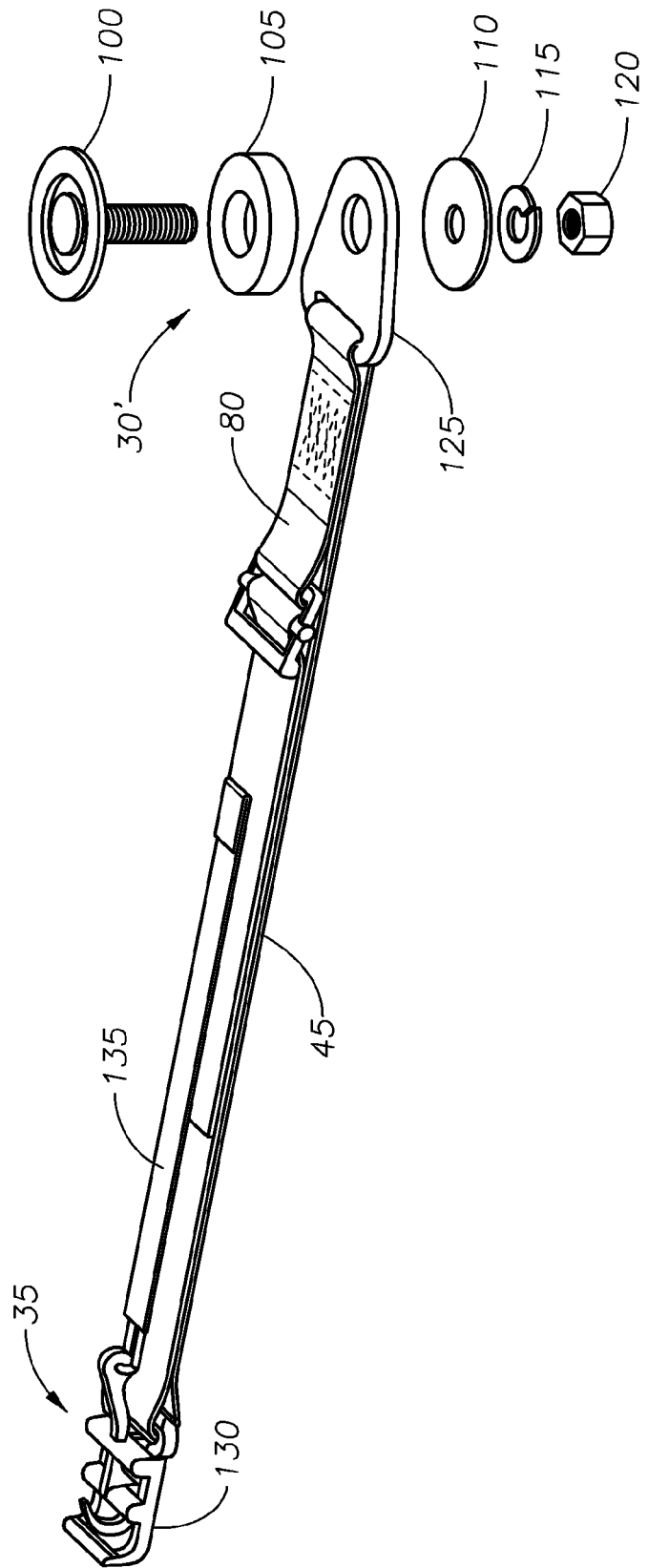
FIG. 7 illustrates a mounting assembly, mounting strap, and a release assembly.

FIG. 7 illustrates an embodiment in which mounting assembly 30' is attached to mounting strap 45 with release assembly 35 attached to mounting strap 45 on the opposing end from mounting assembly 30'. For illustration purposes only, mounting assembly 30 is shown in an exploded view. In an embodiment as shown, mounting strap 45 has a length that is adjustable by adjusting means 80. Bond stud 100 passes through bracket 125 to secure mounting strap 45, with the opposing end of mounting strap 45 secured to release assembly 35. As shown in FIGS. 1 and 2, strap 40 is secured to the opposing end of release assembly 35 from mounting strap 45.

Figure 8:
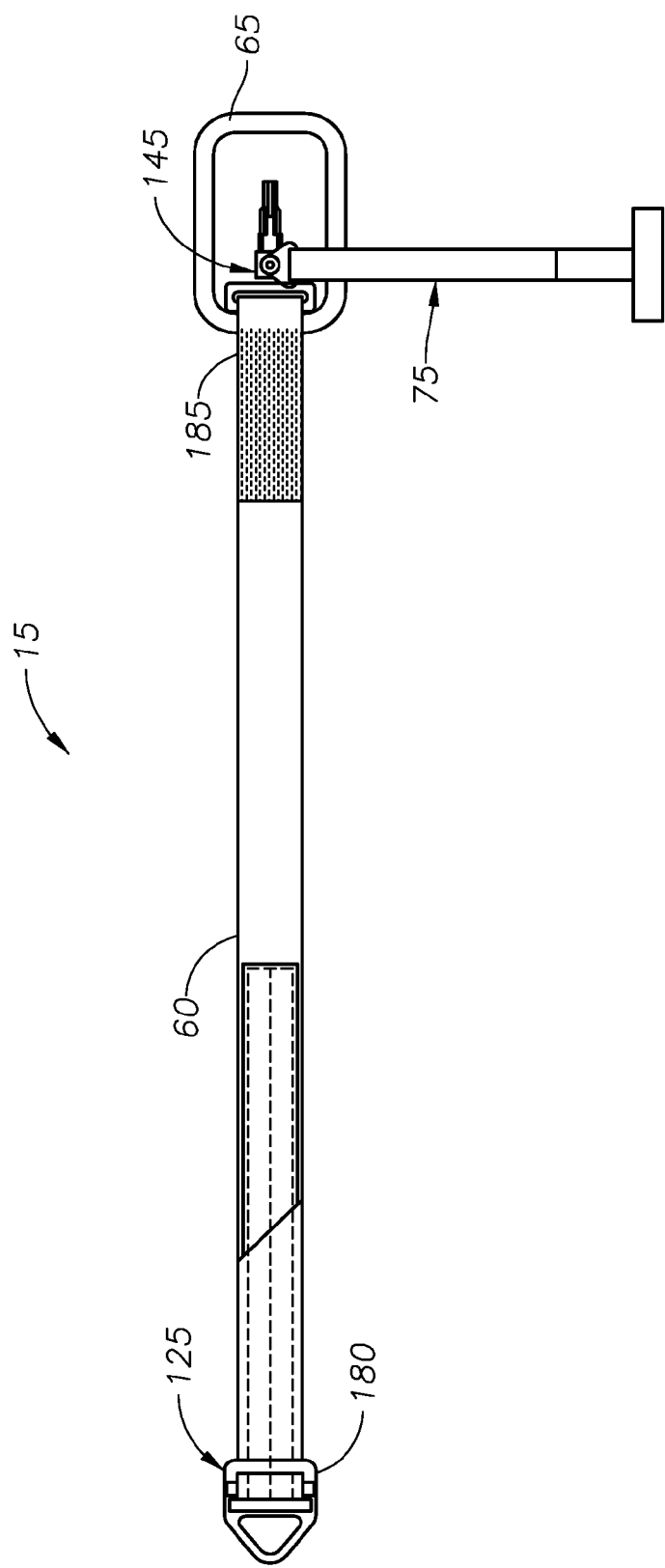
FIG. 8 illustrates a front view of a restraint harness belt.

FIG. 8 illustrates an embodiment of restraint harness belt 15 in which restraint harness belt 15 has belt strap 60 and bracket 125. Belt strap 60 has bracket 125 secured to one end and belt release 145 secured to the opposing end of belt strap 60. Belt release 145 is any mechanism suitable for receiving bracket 125 and securing ends 180 and 185 together. It is to be understood that restraint harness belt 15 is not limited to bracket 125 and belt release 145 but may include any other suitable means for attaching ends 180 and 185 together. In an embodiment as shown, belt strap 60 has an adjustable length, which allows belt strap 60 to be adjusted to the waist of the individual to suitably secure the individual in soldier platform system 5. In an embodiment as illustrated in FIG. 8, pull strap 75 is attached to the release mechanism of belt release 145. A suitable pulling force applied to pull strap 75 activates the release mechanism and releases bracket 125 from belt release 145. Without limitation, pull strap 75 provides a quick release of restraint harness belt 15 and allows the individual to exit restraint harness belt 15 quickly. In an embodiment as illustrated in FIG. 8, restraint harness belt 15 has belt pad 65. Belt pad 65 may have any configuration and size suitable for providing a cushion between the individual and bracket 125 and belt release 145 when secured to each other.

FIGS. 1-3 illustrate an embodiment of soldier platform system 5 in which restraint harness belt 15 is attached to seat assembly 10 by tethers 55. The tethers 55 may be secured to any suitable part of seat assembly 10. In an embodiment, tethers 55 are secured to straps 40 and/or seat 20. Tethers 55 are also secured to belt strap 60. Tethers 55 may be secured to belt strap 60 at any suitable location. In an embodiment, tethers 55 are slidably attached to belt strap 60, which allows the location of tethers 55 to be adjusted. Without limitation, adjusting the location of tethers 55 on belt strap 60 allows their location to be adjusted to take into account an adjustment in the length of belt strap 60. Tethers 55 may be secured to seat assembly 10 by any suitable means. In an embodiment, tethers 55, straps 40, and mounting strap 45 have sufficient tension to maintain the desired suspension of seat 20 to secure the individual within soldier platform system 5 but also to allow the individual a desired amount of ability to conduct desired tasks (i.e., operate a weapon in the gun turret, lean over, turn body to view outside vehicle, and the like).

Figure 9:
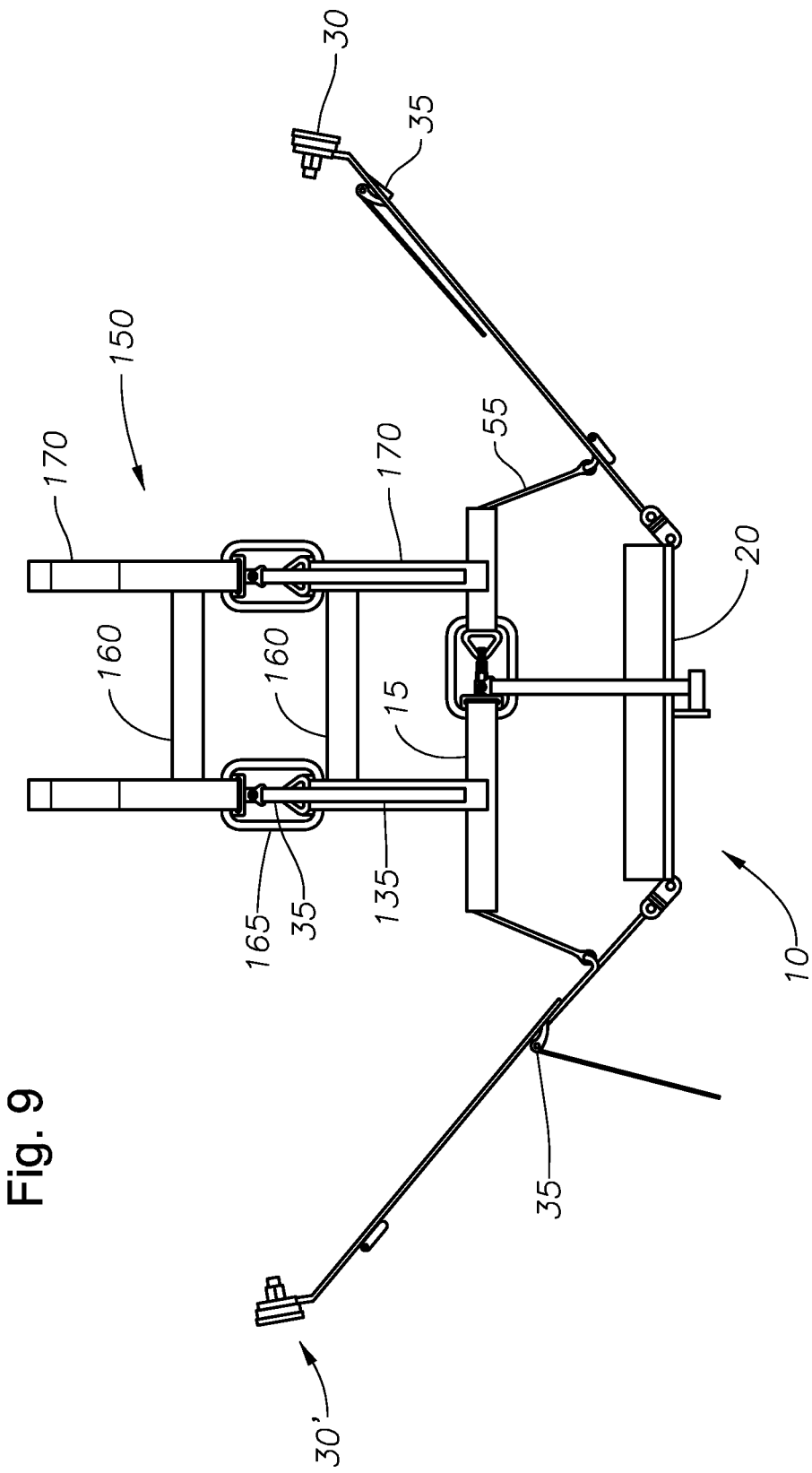
FIG. 9 illustrates a front view of a seat assembly, a restraint harness belt, and a shoulder harness.
Figure 10:
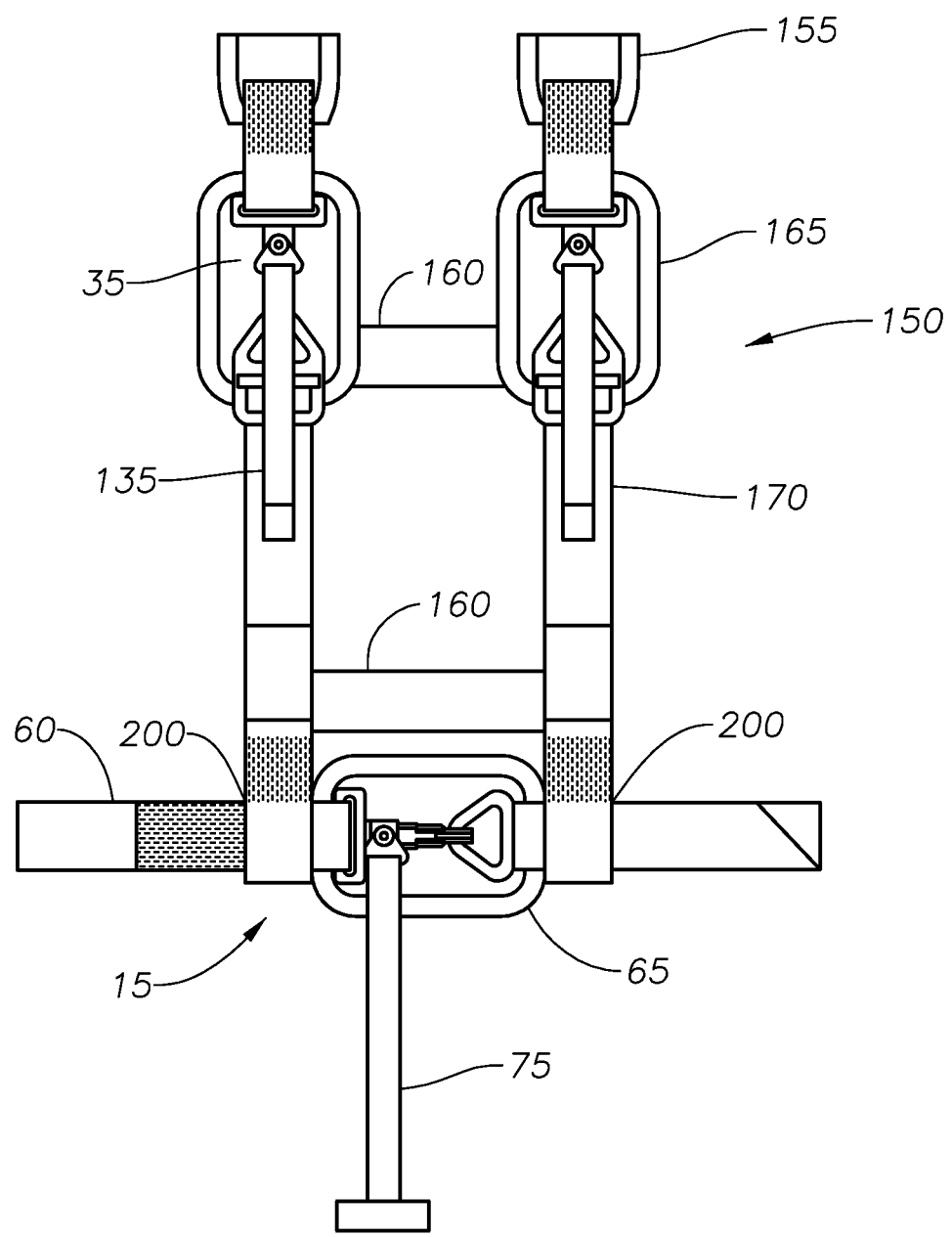
FIG. 10 illustrates a front view of a restraint harness belt and a shoulder harness.

In some embodiments as illustrated in FIGS. 1 and 9, soldier platform system 5 has a shoulder harness 150 attached to restraint harness belt 15. FIG. 10 illustrates a front view of shoulder harness 150 attached to restraint harness belt 15.

Shoulder harness 150 includes shoulder harness straps 170. FIG. 11 illustrates a side view of an embodiment of soldier platform system 5 having shoulder harness 150. In an embodiment as illustrated, shoulder harness 150 has two shoulder harness straps 170 that are each attached to the front side 190 and back side 195 of restraint harness belt 15. Each shoulder harness strap 170 passes over the shoulder of the individual. Shoulder harness straps 170 have a tension sufficient to secure the individual within soldier platform system 5 but that also allows the individual to conduct desired tasks. In some embodiments, the width between shoulder harness straps 170 is adjustable. Without limitation, adjusting the width between shoulder harness straps 170 allows the shoulder width of different individuals to be taken into account. The width may be adjusted by any suitable means. In embodiments as illustrated, belt strap 60 passes through loops 200 in each shoulder harness strap 170 to allow adjustment of the width. It is to be understood that shoulder harness 150 is not limited to two shoulder harness traps 170 but in alternative embodiments (not illustrated) may also include more than two shoulder harness straps 170. In embodiments as illustrated, shoulder harness straps 170 each have a release assembly 35. In an embodiment, the release assemblies 35 have release straps 135. In some embodiments, the release assemblies 35 are located in the front of shoulder harness straps 170. Without limitation, locating the release assemblies 35 in the front of shoulder harness straps 170 allows the individual to release the shoulder harness 150, with the release straps 135 allowing a quick release. In alternative embodiments (not illustrated), only one of the shoulder harness straps 170 has a release assembly 35. In some embodiments as illustrated, shoulder harness straps 170 have buckle pads 165, which are disposed between the individual and release assembly 35. Buckle pads 165 may have any configuration and size suitable for providing a cushion between the individual and release assembly 35 when secured to each other. In some embodiments, shoulder harness 150 also includes back supports 160. FIG. 12 illustrates a back view of shoulder harness 150 and restraint harness belt 15 showing back supports 160. Shoulder harness 150 may have any desirable number of back supports 160. In embodiments as illustrated, shoulder harness 150 has a back support 160 in an upper region of shoulder harness 150 and a back support 160 in a lower region of shoulder harness 150. Without limitation, such locations of back supports 160 provide support for the upper and lower back of the individual. Back supports 160 may be composed of any suitable material. In some embodiments as illustrated, shoulder harness straps 170 also have shoulder pads 155. Without limitation, shoulder pads 155 provide a cushion to the shoulders of the individual.

Figure 13:
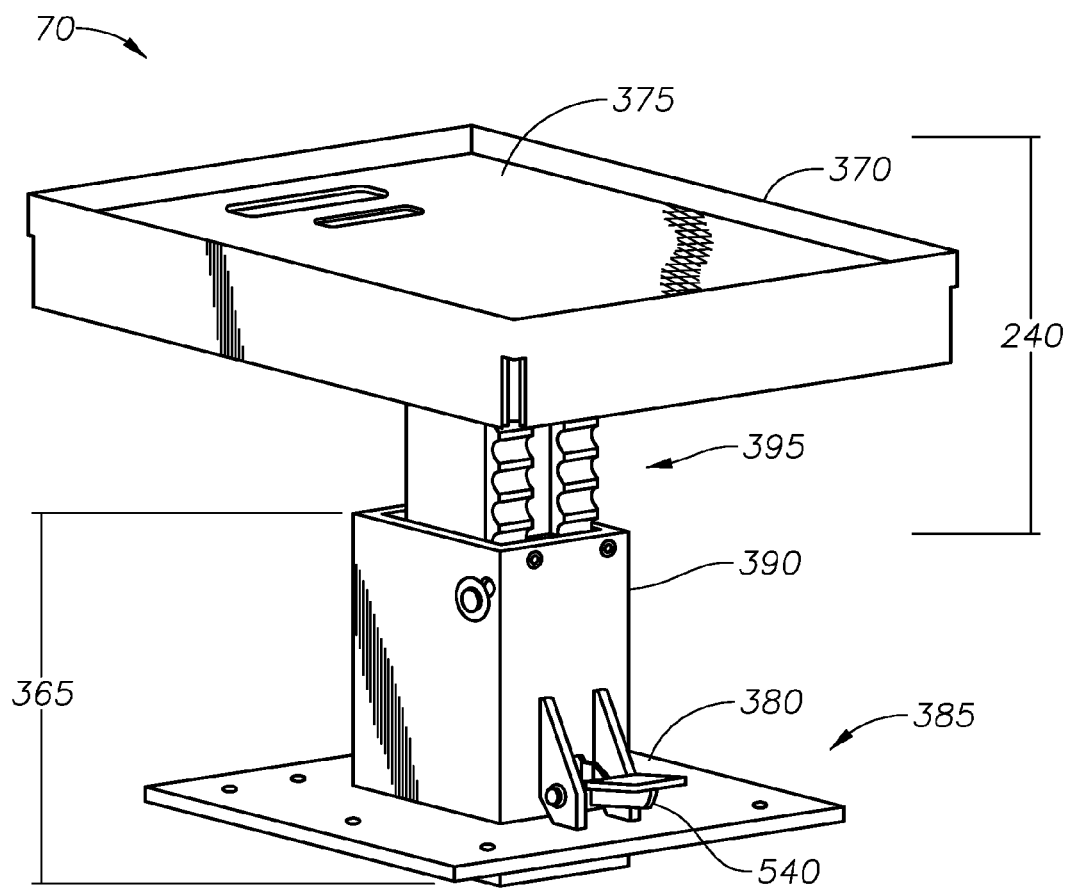
FIG. 13 illustrates a perspective view of a ratchet platform having a platform upper assembly and a platform lower assembly.
Figure 14:
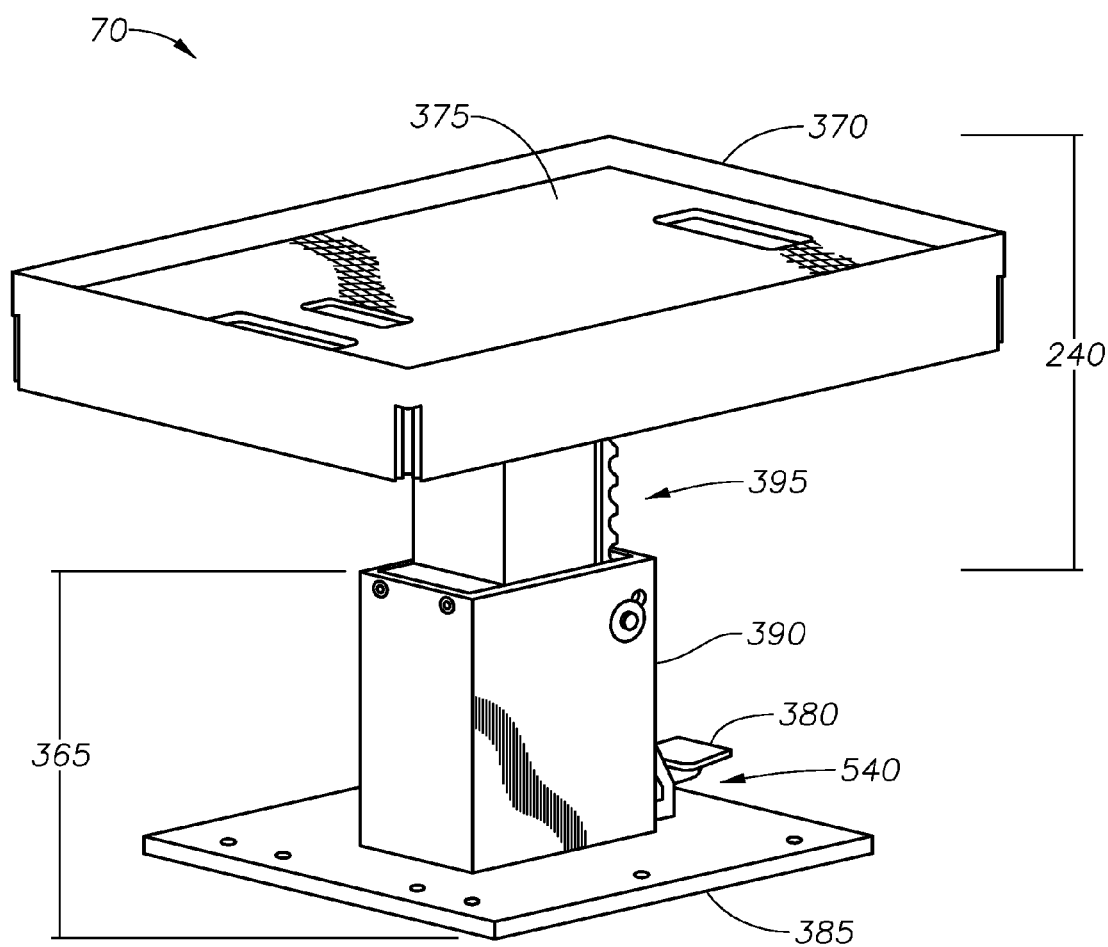
FIG. 14 illustrates a perspective view of a ratchet platform having a platform upper assembly and a platform lower assembly.
Figure 15:
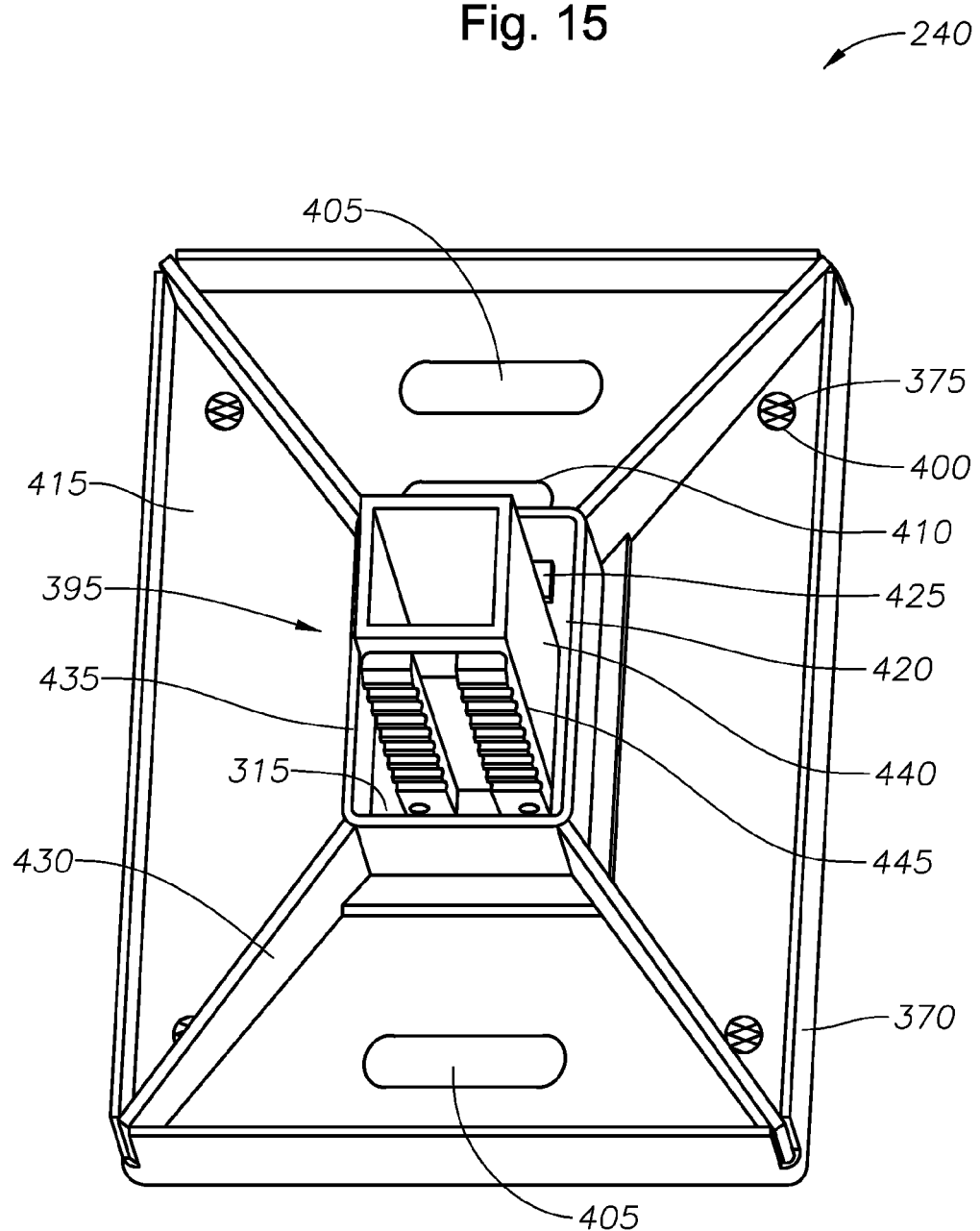
FIG. 15 illustrates a perspective bottom view of a platform upper assembly.

FIGS. 1, 13, and 14 illustrate ratchet platform 70 having platform upper assembly 240 and platform lower assembly 365. Ratchet platform 70 is adapted for disposition within a vehicle. Platform upper assembly 240 includes toe queue 370, platform grating 375, and ratchet 395. Toe queue 370 is a wall that extends around the periphery of platform 415, as shown in FIG. 15. Without limitation, toe queue 370 facilitates prevention of an individual standing on ratchet platform 70 from falling off ratchet platform 70 by stopping sliding of a foot of the individual off ratchet platform 70. When the standing individual's foot contacts toe queue 370, toe queue 370 also provides notice to the standing individual that the individual's foot is at the edge of platform 415. Platform grating 375 has any configuration and material suitable for providing resistance against sliding of the standing individual's foot. Platform lower assembly 365 includes platform upper assembly actuator 380, platform base 385, and support column 390. Platform upper assembly actuator 380 may include any means for actuating vertical movement (i.e., up and down) of platform upper assembly 240 such as a pedal sub assembly, an electrical actuator, a crank actuator, and the like. In an embodiment as illustrated in FIGS. 1, 13, and 14, platform upper assembly actuator 380 includes pedal sub assembly 540. Pedal sub assembly 540 actuates ratchet 395 and thereby actuates movement of platform upper assembly 240. Support column 390 provides support to platform 415 and also provides protection to the portion of platform upper assembly actuator 380 disposed within support column 390. Platform base 385 provides a base and support to platform upper assembly 240 and support column 390.

Figure 16:
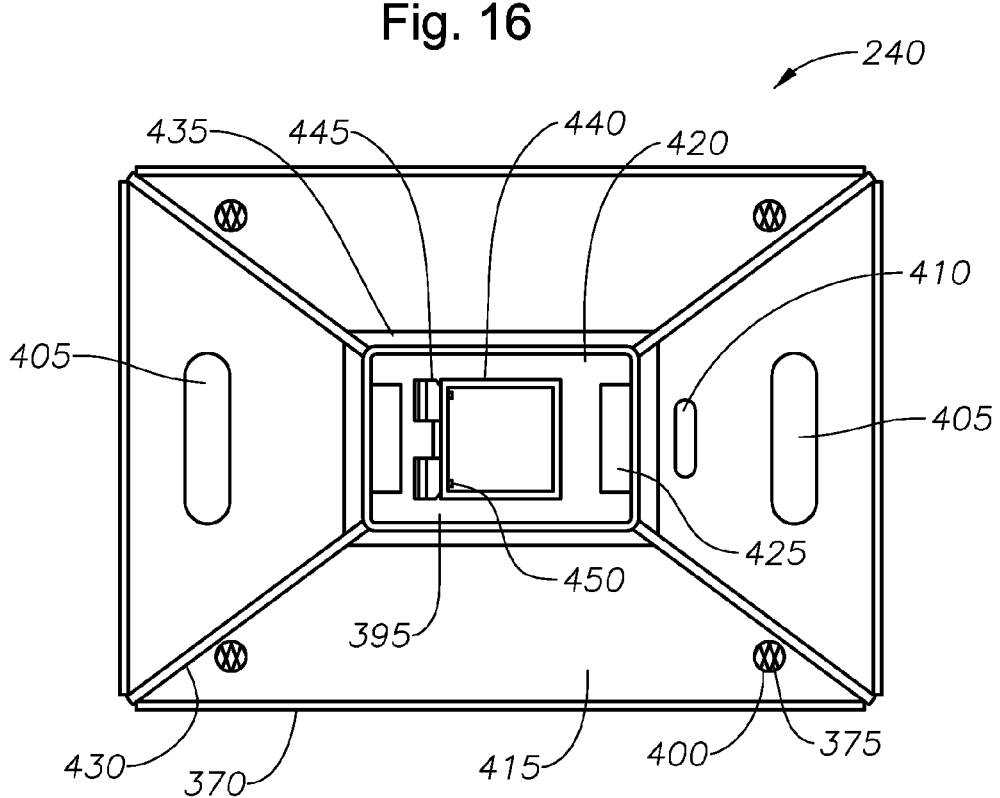
FIG. 16 illustrates a bottom view of a platform upper assembly.

FIG. 15 illustrates a bottom perspective view of platform upper assembly 240, and FIG. 16 illustrates a bottom view of platform upper assembly 240. As shown in FIGS. 15 and 16, platform upper assembly 240 includes platform 415. Platform 415 may be composed of any material having a suitable strength to support the weight of an individual standing on platform 415. Platform 415 is shown having a rectangular shape but it is to be understood that platform 415 is not limited to a rectangular shape but instead may have any shape suitable for use in a vehicle. Platform grating 375 is secured to platform 415 by any suitable method such as by welding, glue, and the like. Platform 415 also has openings 405. In an embodiment as illustrated in FIG. 15, openings 405 may be of a suitable configuration and size to allow an individual to pass a portion of the individual's hands therethrough for movement of platform 415. Openings 405 pass through platform 415 and platform grating 375. In alternative embodiments (not illustrated), openings 405 have any configuration and size suitable for a desired purpose. Platform 415 is shown with two openings 405 but in alternative embodiments (not illustrated) may have one opening 405 or more than two openings 405. Platform 415 also has drains 400. Without limitation, drains 400 allow liquids disposed on the top side of platform 415 to pass through platform 415 via drains 400. Platform upper assembly 240 also includes platform tube core 420.

As shown in FIGS. 15 and 16, ratchet 395 includes platform riser tube 440 and ratchet rail 445. Ratchet 395 may be secured to platform 415 by any suitable method such as by weld, screws, glue, and the like. In an embodiment as illustrated in FIGS. 15 and 16, ratchet 395 is secured to platform tube core 420, which is secured to platform 415. Ratchet 395 is secured by securing top portion 315 using any suitable means. Ratchet 395 is slidable within support column 390. Without limitation, platform tube core 420 provides reinforcement strength to platform 415. Further, without limitation, platform tube core 420 facilitates production. Platform tube core 420 may be secured to platform 415 by any suitable method. Platform riser tube 440 has a length sufficient to allow ratchet platform 415 to be adjusted to any desirable height of an individual standing on platform 415. Platform riser tube 440 also has a configuration suitable for slidable disposition within support column 390. Ratchet rail 445 is secured to a side of platform riser tube 440. In some embodiments, platform upper assembly 240 also includes crash blocks 425. Without limitation, crash blocks 425 prevent damage to upper tube guide 500 (not illustrated) from contact by support column 390. Crash blocks 425 are also secured to platform 415. In an embodiment as illustrated in FIGS. 15 and 16, crash blocks 425 are secured to platform 415 by securing of crash blocks 425 to platform tube core 420. In some embodiments, platform upper assembly 240 also includes platform gussets 430 and gusset wall 435. Platform gussets 430 are brackets that provide support to platform 415. In an embodiment as illustrated in FIGS. 15 and 16, platform upper assembly 240 includes four platform gussets 430 but in alternative embodiments (not illustrated) includes more than four or less than four platform gussets 430. Platform gussets 430 are secured to gusset wall 435 and/or a bottom side of platform 415. In an embodiment, gusset wall 435 extends about the periphery of platform tube core 420. As further shown in FIGS. 15 and 16, some embodiments of ratchet platform 415 include platform upper assembly 240 having an attachment opening 410 through platform 415 and platform grating 375.

Figure 17:
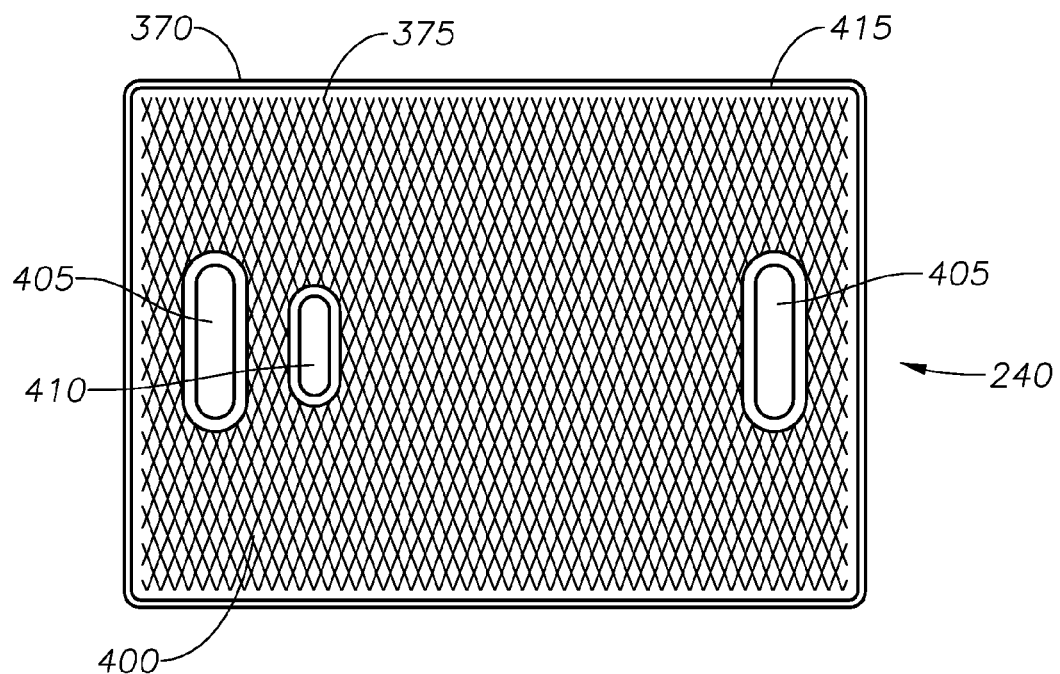
FIG. 17 illustrates a top view of a platform upper assembly.

FIG. 17 illustrates a top view of platform upper assembly 240. In an embodiment as illustrated, platform grating 375 substantially covers the top surface of platform 415 but not openings 405 and attachment opening 410. In embodiments as illustrated, openings 405 are disposed at locations on platform 415 sufficient to allow an individual to pick up and move ratchet platform 70.

Figure 18:
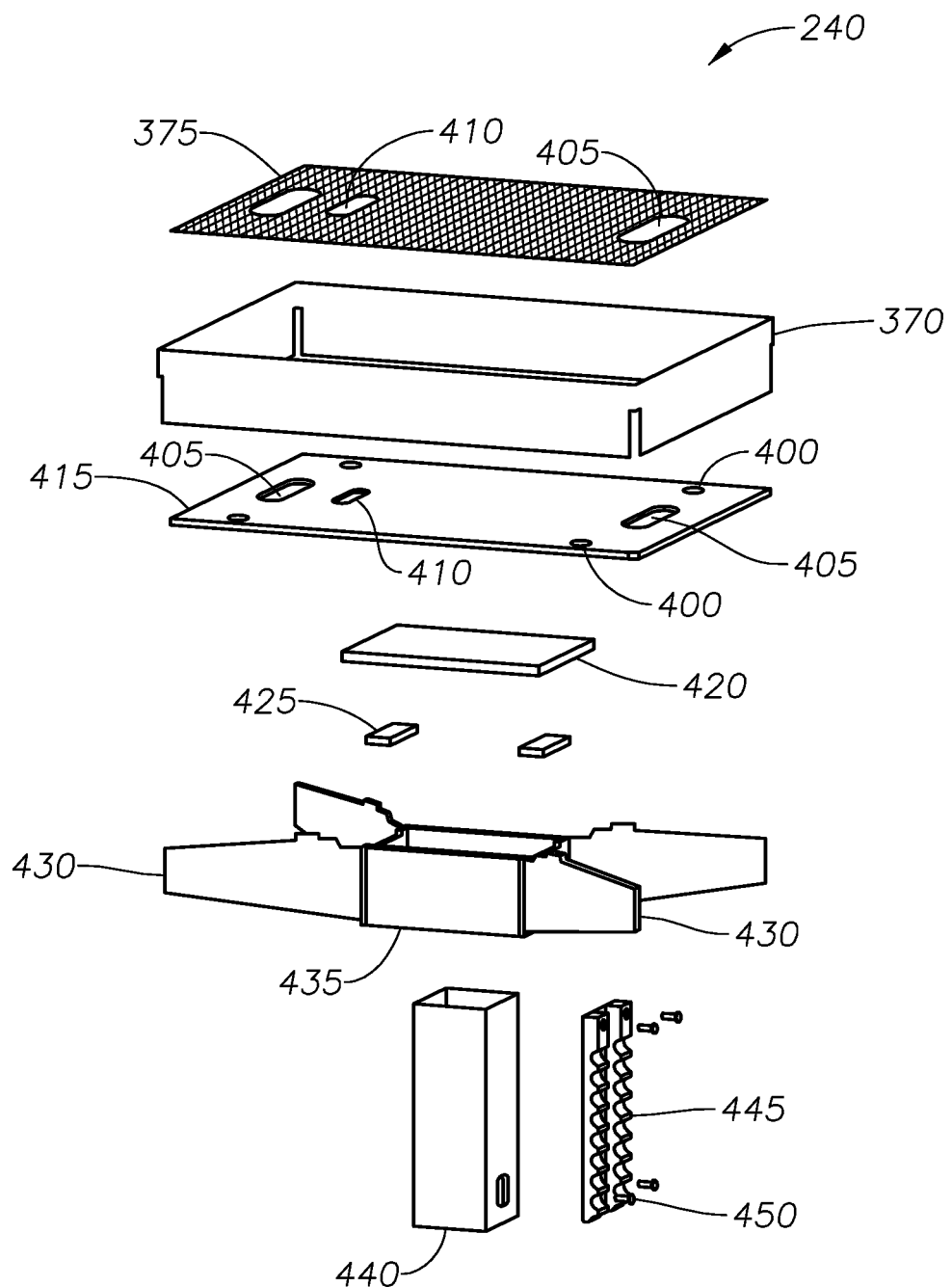
FIG. 18 illustrates an exploded view of a platform upper assembly.

FIG. 18 illustrates an exploded view of platform upper assembly 240. As shown, platform tube core 420 is disposed within gusset wall 435. In embodiments, ratchet rail 445 is secured to platform riser tube 440 by screws 450.

Figure 19:
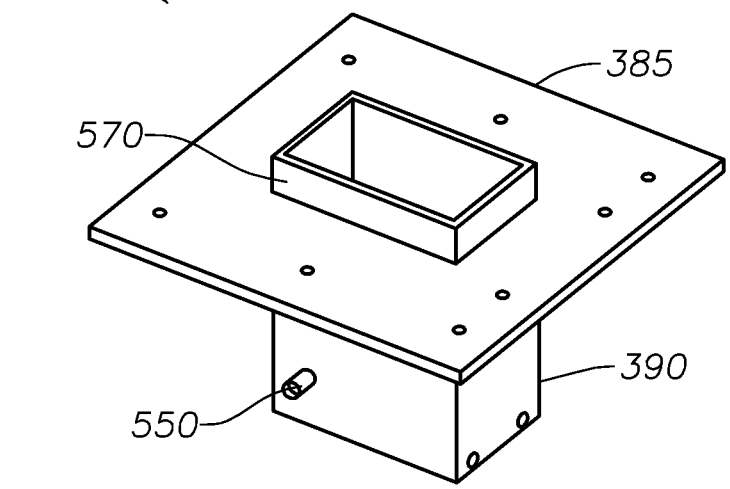
FIG. 19 illustrates a perspective view of a platform lower assembly.

FIG. 19 illustrates a perspective bottom view of platform lower assembly 365. In embodiments as illustrated, a lower portion 570 of support column 390 passes through platform base 385. Without limitation, allowing lower portion 570 of support column 390 to pass through platform base 385 provides a desired range of adjustability. Support column 390 includes actuator grooves 550 on opposing sides of support column 390. In an embodiment, platform base 385 is adapted to be secured within a vehicle (i.e., to a floor of the vehicle).

Figure 20:
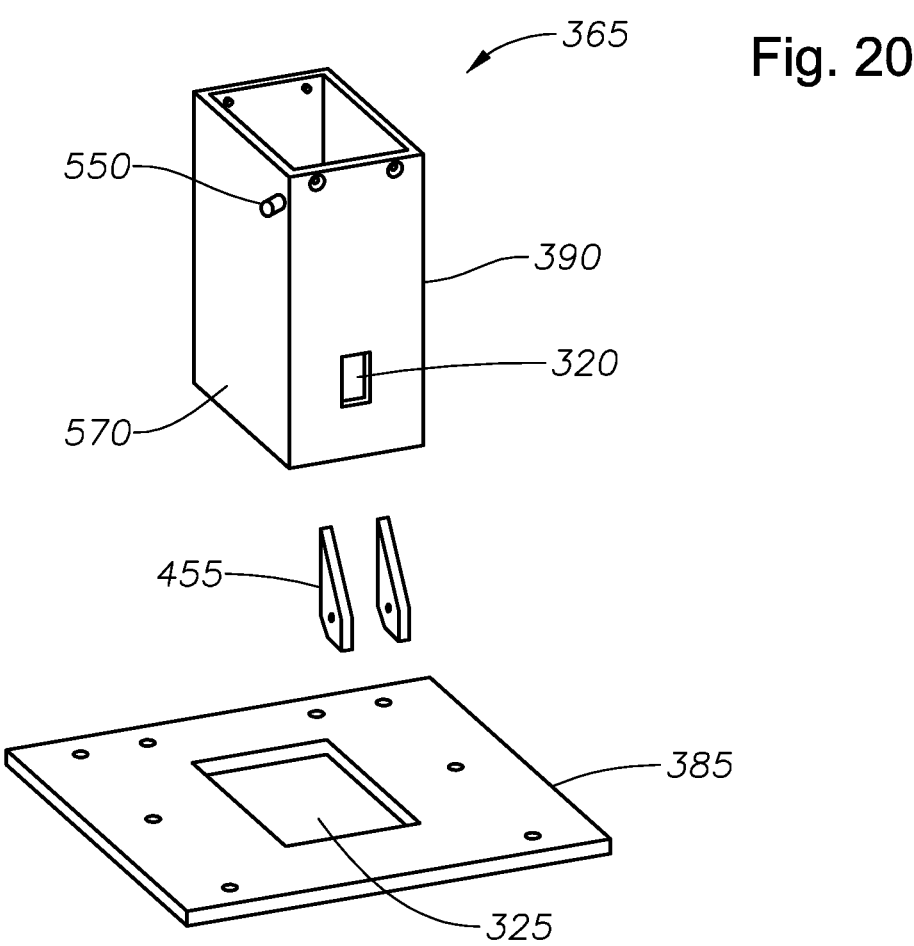
FIG. 20 illustrates an exploded view of a platform lower assembly.

FIG. 20 illustrates an exploded view of platform lower assembly 365. Support column 390 includes pedal opening 320 of sufficient dimensions to facilitate pedal sub assembly 540 (not illustrated). Pedal pivot supports 455 are disposed on opposing sides of pedal opening 320. Platform base 385 includes platform base opening 325 of sufficient dimensions to allow lower portion 570 to pass therethrough. In some embodiments, support column 390 is secured to platform base 385 by press fit.

Figure 21:
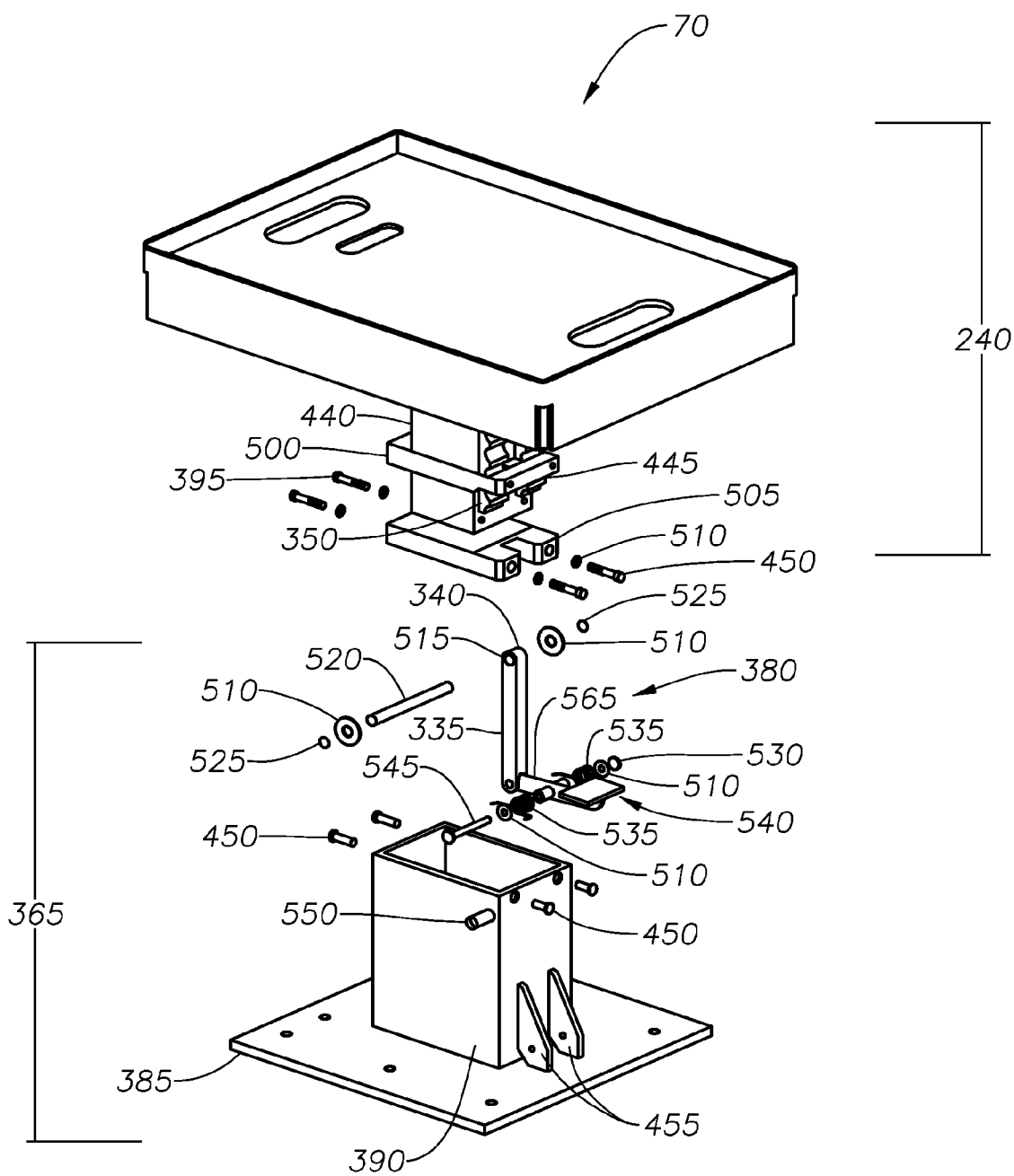
FIG. 21 illustrates a ratchet platform with an exploded view of a platform upper assembly actuator.
Figure 22:
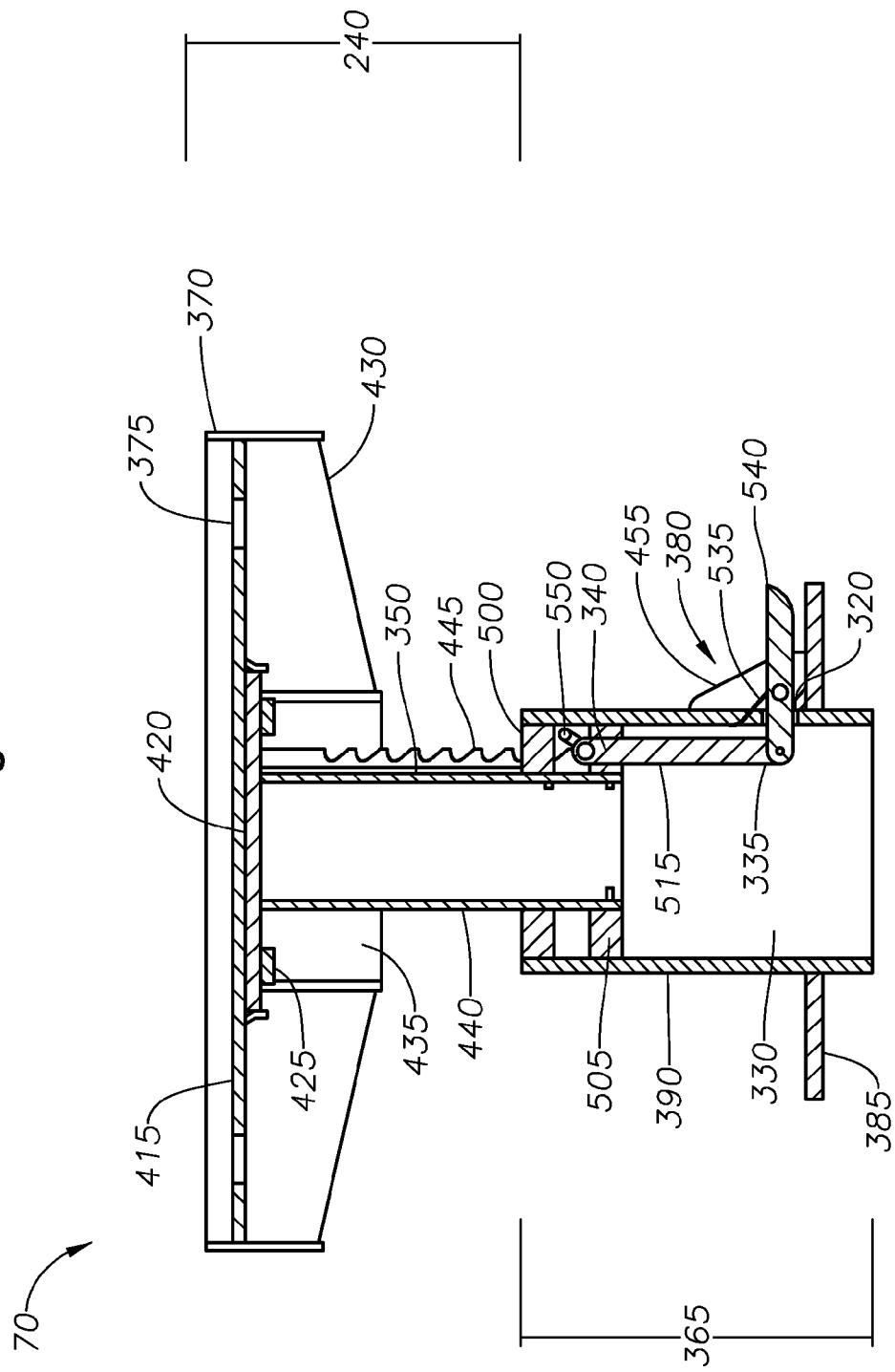
FIG. 22 illustrates a cross sectional side view of a ratchet platform.
Figure 23:
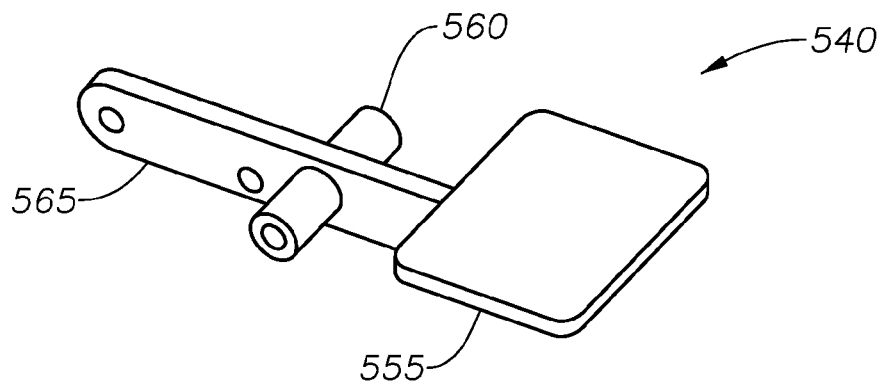
FIG. 23 illustrates a pedal sub assembly.
Figure 24:
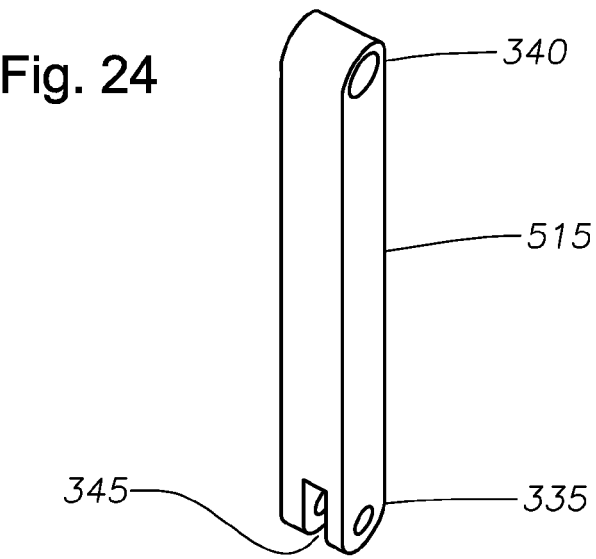
FIG. 24 illustrates an upper linkage.
Figure 25:
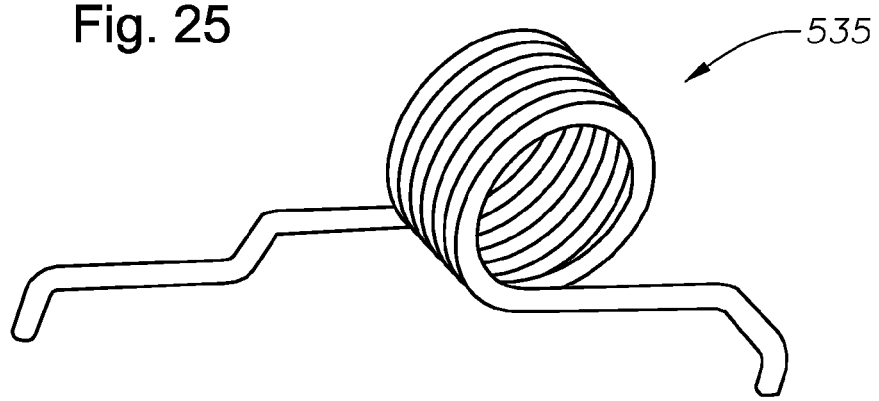
FIG. 25 illustrates a torsion spring.

FIG. 21 illustrates an embodiment of ratchet platform 70 in which platform upper assembly actuator 380 includes pedal sub assembly 540. In FIG. 21, platform upper assembly actuator 380 is shown in exploded view. FIG. 22 illustrates a cross sectional side view of the embodiment of ratchet platform 70 illustrated in FIG. 21. Platform upper assembly actuator 380 includes pedal sub assembly 540 and may have any suitable configuration for actuating platform upper assembly 240. As shown, a portion of pedal linkage 565 of pedal sub assembly 540 passes through pedal opening 320 into interior 330 of support column 390. Pedal sub assembly 540 may have any suitable configuration for actuation. FIG. 23 illustrates an embodiment of pedal sub assembly 540 in which pedal sub assembly 540 includes pedal 555, pedal pivot pin 560, and pedal linkage 565. In an embodiment, pedal 555 has sufficient size to allow actuation by pressure from the foot of an individual. Pedal sub assembly 540 may be attached to support column 390 by any suitable method. In an embodiment as shown in FIGS. 21-23, bolt 545 passes through pedal pivot supports 455 and pedal pivot pin 560. Nut 530 secures bolt 545. In an embodiment, bolt 545 also passes through washers 510. In some embodiments, one or more torsion springs 535 are attached to pedal sub assembly 540. FIG. 25 illustrates a perspective view of a torsion spring 535. In embodiments as illustrated in FIGS. 21, 22, and 25, a torsion spring 535 is disposed on each side of pedal sub assembly 540 outside of the pedal pivot supports 455. The torsion springs 535 are attached to pedal sub assembly 540 by bolt 545. As shown in FIGS. 21 and 22, the portion of pedal linkage 565 in interior 330 is attached to upper linkage 515 at one end 335. Pedal linkage 565 and upper linkage 515 are rotatable in relation to each other at end 335. Upper linkage 515 runs longitudinally within interior 330 and is secured to support column 390 at the other end 340. An embodiment of upper linkage 515 is illustrated in FIG. 24 in which upper linkage 515 has upper linkage groove 345. In an embodiment, the end of pedal linkage 565 opposite pedal 555 is disposed within upper linkage groove 345 and attached to upper linkage 515. In an embodiment as illustrated in FIGS. 21, 22, and 24, end 340 of upper linkage 515 is slidably attached to support column 390 by ratchet pin 520 passing through end 340 and actuator groove 550. Ratchet pin 520 may be secured by any suitable method. In an embodiment as illustrated in FIG. 21, ratchet pin 520 is secured by washers 510 and external snap rings 525. Upper linkage 515 slides ratchet pin 520 longitudinally up through the length of actuator groove 550 when upper linkage 515 is in an upward motion and down through the length of actuator groove 550 when upper linkage 515 is in a downward motion. Ratchet pin 520 is suitably disposed within actuator groove 550 to allow teeth 350 of ratchet rail 445 to be disposed thereupon when ratchet pin 520 is in the downward position (i.e., at the bottom of actuator groove 550). Platform riser tube 440 passes through upper tube guide 500 and lower tube guide 505. Upper tube guide 500 and lower tube guide 505 are secured to support column 390. Actuator groove 550 is disposed on support column 390 between upper tube guide 500 and lower tube guide 505. Upper tube guide 500 and lower tube guide 505 prevent unwanted lateral movement of platform riser tube 440 and facilitate maintaining movement of platform riser tube 440 in a longitudinal direction. Upper tube guide 500 and lower tube guide 505 may be secured to support column 390 by any suitable method. In the embodiment as shown, upper tube guide 500 and lower tube guide 505 are secured to support column 390 by screws 450.

In operation of the embodiments of ratchet platform 70 illustrated in FIGS. 1 and 13-25, ratchet platform 70 is placed in a vehicle (not illustrated). Ratchet platform 70 is secured in a desirable location within the vehicle. Ratchet platform 70 may be secured by any suitable method such as by screwing ratchet platform 70 to a floor or other surface of the vehicle. The vehicle may include any vehicle such as a truck, car, military vehicle, helicopter, air plane, and the like. In an embodiment, ratchet platform 70 is placed in a military vehicle in which it is desired for an individual to stand on platform 415. For instance, in some military vehicles, it is desired for an individual to operate weaponry (i.e., machine gun) that is located on the outside of the vehicle. In such an embodiment, a portion of the individual's body is disposed outside of the vehicle during operation of the weaponry with the remainder of the individual's body within the military vehicle for protection. The height of platform 415 is adjusted by pressing pedal 555. Each time pedal 555 is pressed, the pressure from pedal 555 actuates pedal linkage 565 and pedal linkage 565 moves upwards, which thereby actuates upper linkage 515 longitudinally upward. The longitudinal movement of upper linkage 515 slides ratchet pin 520 longitudinally upward through the length of actuator groove 550. The upward movement of ratchet pin 520 applies force to a tooth 350 of ratchet rail 445 thereby actuating platform upper assembly 240, which moves upward. Pressure is released from pedal 555, and torsion spring 535 applies force to pedal linkage 565 to actuate pedal linkage 565 and move pedal linkage 565 downward, which actuates upper linkage 515 to move longitudinally downward. Such downward movement of upper linkage 515 slides ratchet pin 520 downward through the length of actuator groove 550 to allow the tooth 350 below the previous tooth 350 (in which the force was applied) to be disposed upon ratchet pin 520. By such disposition of the next tooth 350 upon ratchet pin 520, further downward movement of platform upper assembly 240 is prevented. Pedal 555 may be pressed and released until platform 415 is at the desired height. To reduce the height of platform 415, pedal 555 is pressed and held, which maintains ratchet pin 520 in an upper position within actuator groove 550. With ratchet pin 520 maintained in an upper position within actuator groove 550, ratchet pin 520 is not in contact with teeth 350, and platform upper assembly 240 slides downward until the pressure is released from pedal 555 or support column 390 contacts platform 415. As platform upper assembly 240 slides downward, platform riser tube 440 slides downward in interior 330.

Figure 26:
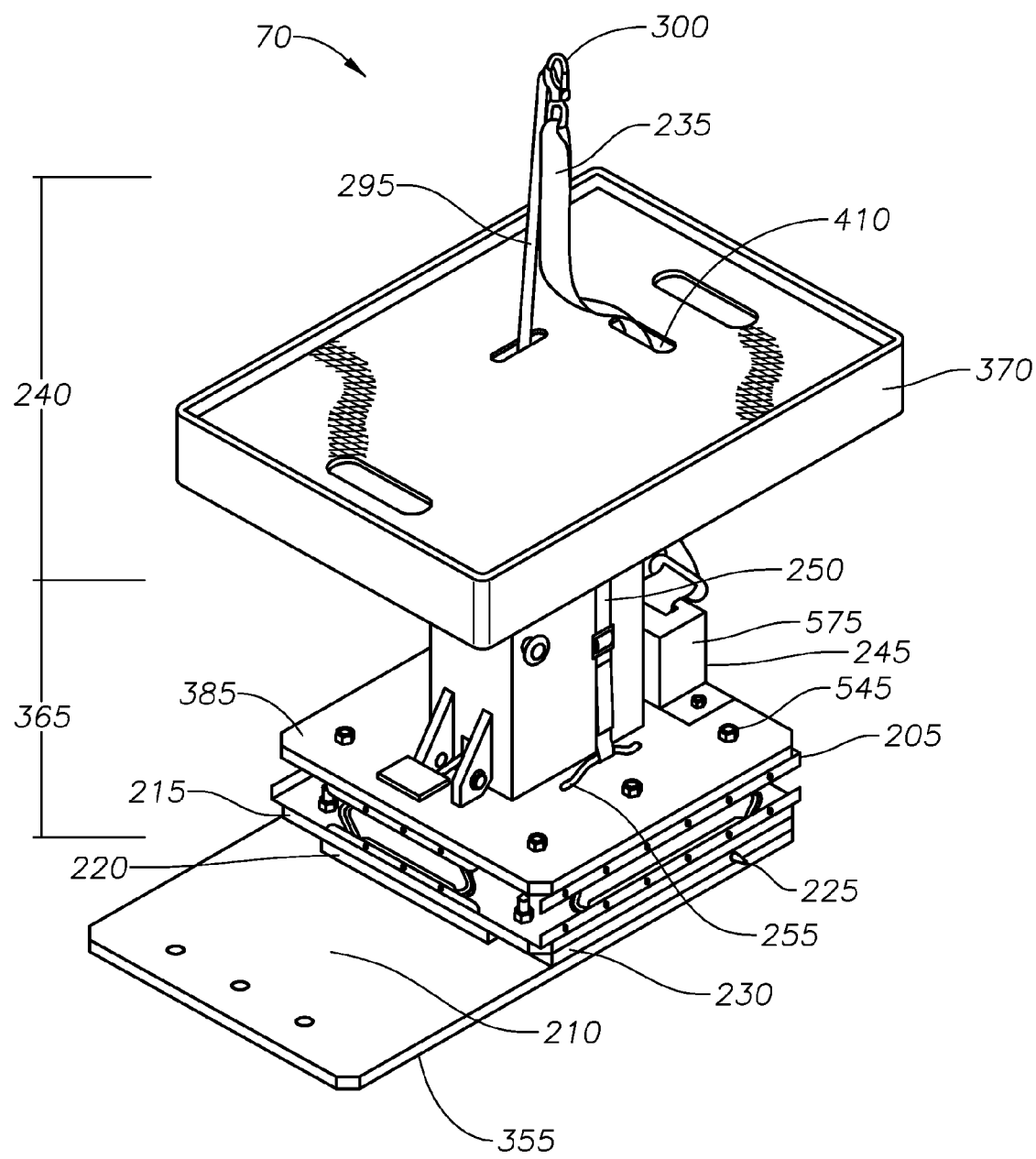
FIG. 26 illustrates a ratchet platform having a platform upper assembly, a platform lower assembly, a ratchet platform attachment means, an energy attenuation system, a base plate, and a seat plate.
Figure 27:
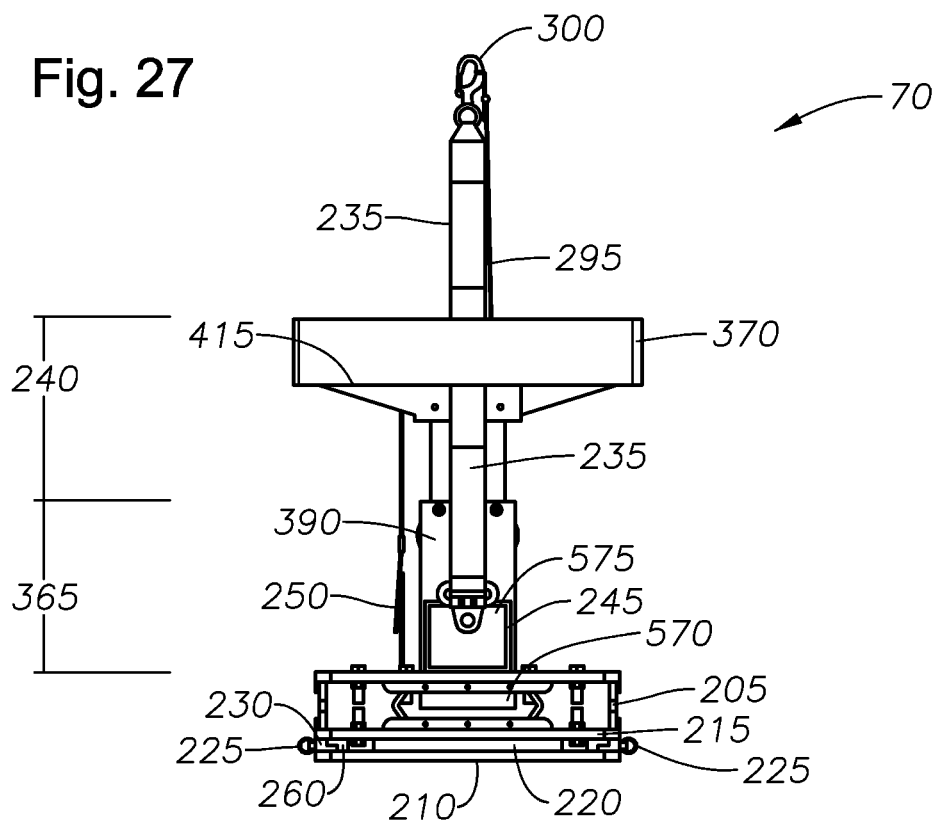
FIG. 27 illustrates a side view of the ratchet platform of FIG. 26.
Figure 28:
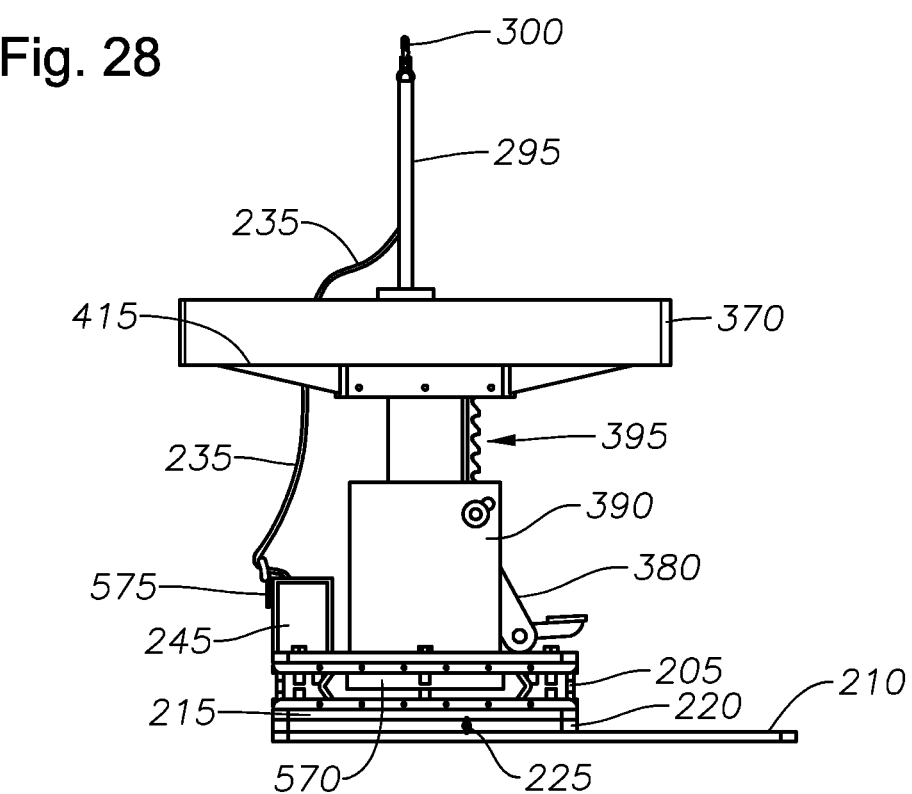
FIG. 28 illustrates a side view of the ratchet platform of FIG. 26.

FIG. 26 illustrates a perspective view of an embodiment of ratchet platform 70 in which ratchet platform 70 further includes energy attenuation system 205. FIGS. 27 and 28 illustrate side views of an embodiment of ratchet platform 70 including energy attenuation system 205. Energy attenuation system 205 includes any system suitable for reducing or preventing energy applied to the bottom 355 of ratchet platform 70 from passing to the individual standing on platform 415. For instance, in an embodiment in which ratchet platform 70 is disposed within a military vehicle, a mine or improvised explosive device exploding underneath or near the military vehicle applies force to the military vehicle and thereby to ratchet platform 70. Energy attenuation system 205 reduces or prevents the energy from passing through ratchet platform 70 to the individual standing on platform 415, thereby protecting the individual from harm. Without limitation, an example of a suitable energy attenuation system 205 includes a SHOCKRIDE CRUSH BOX, commercially available from ArmorWorks Enterprises, LLC. Energy attenuation system 205 is secured to platform base 385. In an embodiment, energy attenuation system 205 is secured to a bottom side of platform base 385.

Figure 29:
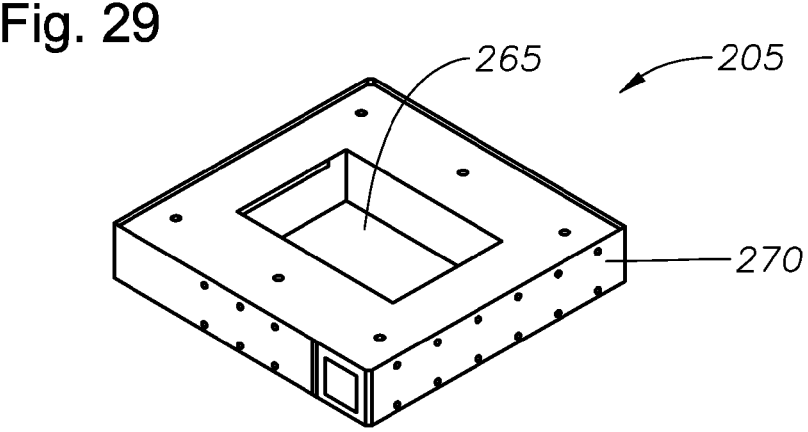
FIG. 29 illustrates an energy attenuation system.

FIG. 29 illustrates a perspective view of an embodiment of energy attenuation system 205 including outer covering 270. Outer covering 270 is secured to the periphery of energy attenuation system 205. In an embodiment, outer covering 270 is removeable. Without limitation, outer covering 270 prevents unwanted objects from being disposed within energy attenuation system 205. In an embodiment as illustrated in FIG. 29, energy attenuation system 205 also includes energy attenuation opening 265, which is an opening through the interior of energy attenuation system 205. In an embodiment, energy attenuation opening 265 has suitable dimensions to allow ratchet 395 to pass therethrough.

Figure 30:
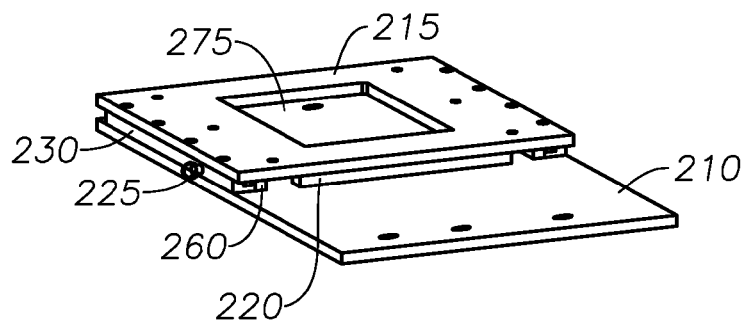
FIG. 30 illustrates a base plate and a seat plate.
Figure 31:
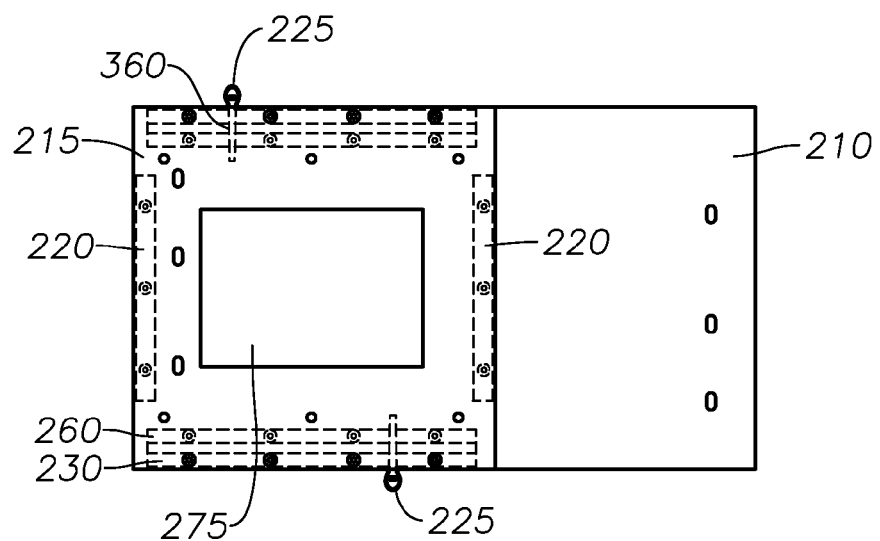
FIG. 31 illustrates a cross sectional top view of a seat plate and a base plate.
Figure 32:
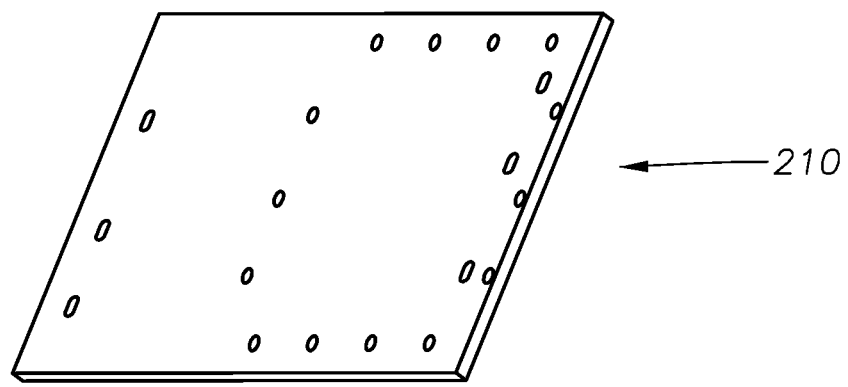
FIG. 32 illustrates a base plate.
Figure 33:
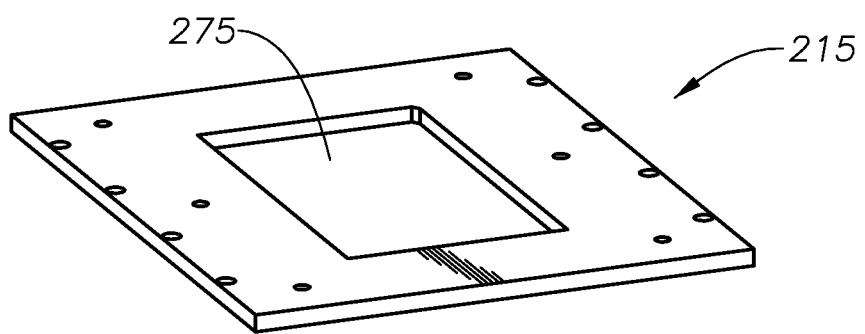
FIG. 33 illustrates a seat plate.
Figure 34:
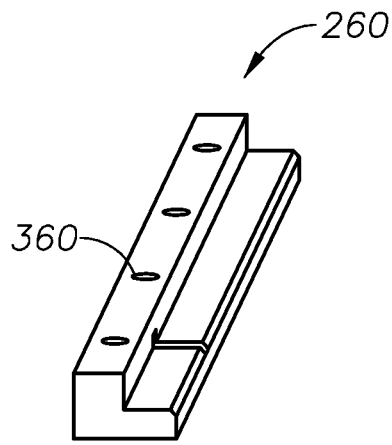
FIG. 34 illustrates a base plate rail.
Figure 35:
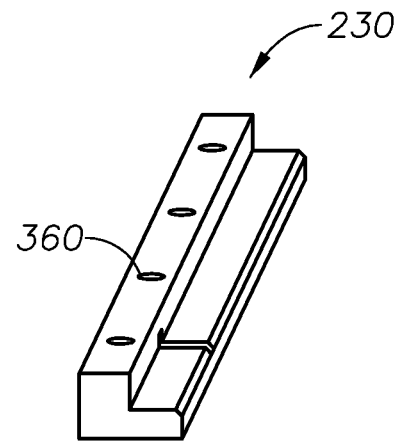
FIG. 35 illustrates a seat plate rail.
Figure 36:
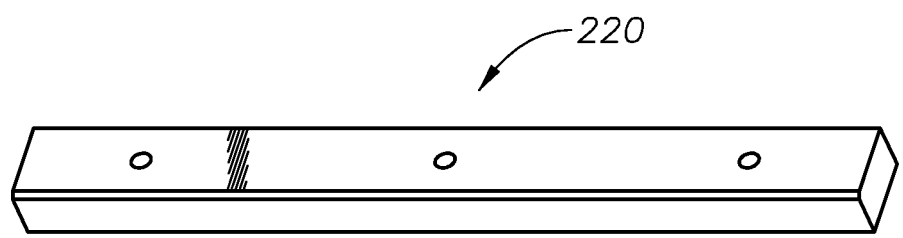
FIG. 36 illustrates a base plate shim bar.
Figure 37:
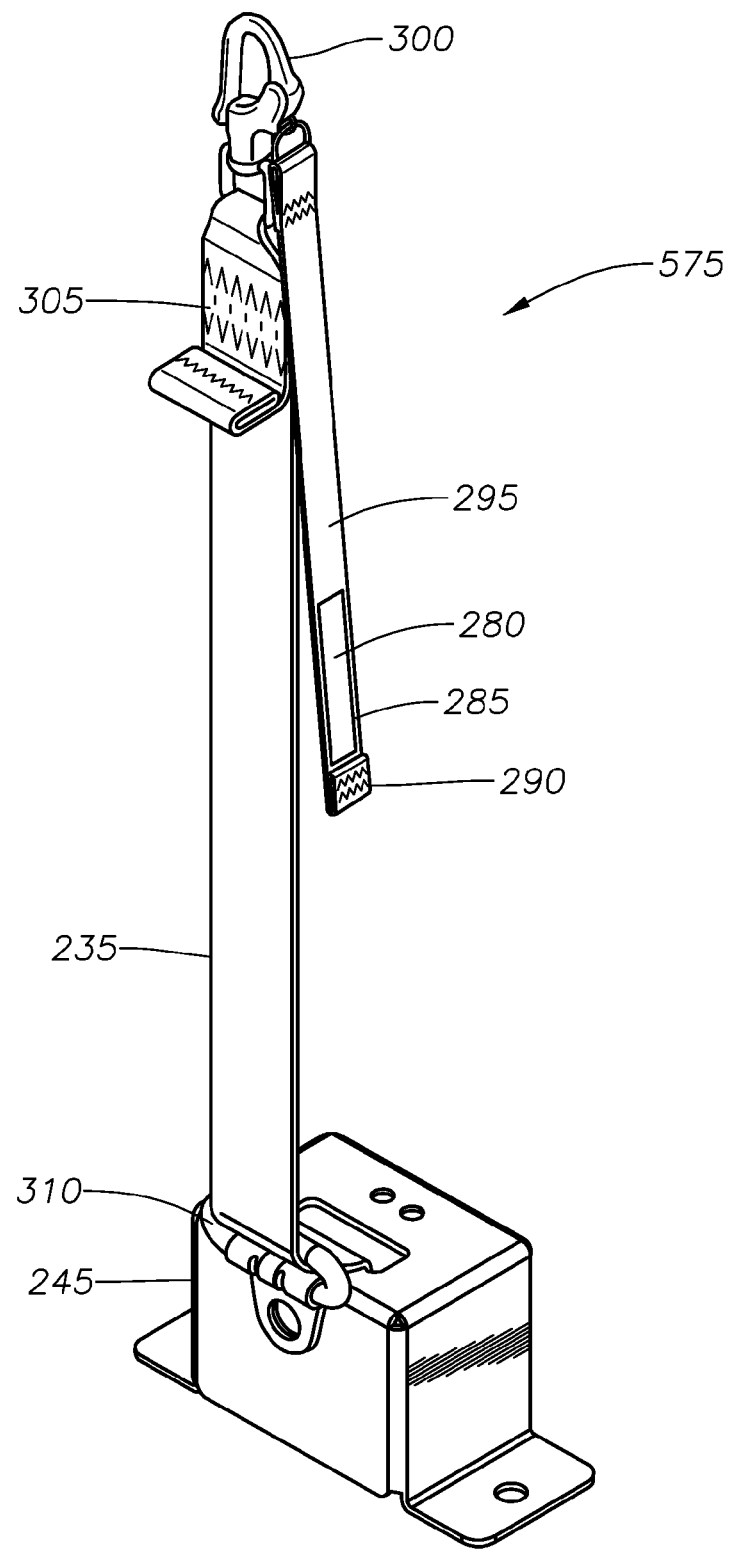
FIG. 37 illustrates a ratchet platform attachment means.

In some embodiments as illustrated in FIGS. 26-28, ratchet platform 70 further includes base plate 210 and seat plate 215. FIG. 30 illustrates a perspective view of base plate 210 and seat plate 215. FIG. 31 illustrates a top cross sectional view of base plate 210 and seat plate 215. Seat plate 215 is secured to platform base 385 or, in embodiments in which ratchet platform 70 includes energy attenuation system 205, to energy attenuation system 205. Seat plate 215 provides support to platform upper assembly 240, platform lower assembly 365, and energy attenuation system 205. Seat plate 215 includes seat plate rails 230 on opposing sides of seat plate 215. In embodiments as illustrated in FIGS. 30, 31, and 33, seat plate 215 further includes seat plate opening 275, which has suitable configuration to allow ratchet 395 to pass therethrough. In an embodiment, base plate 210 has a length greater than seat plate 215. Base plate 210 is secured to the vehicle. In some embodiments, base plate 210 is secured to the floor of the vehicle. Base plate 210 has base plate rails 260 on opposing sides of base plate 210. Each base plate rail 260 has slidable contact with the opposing seat plate rail 230 whereby seat plate 215 is longitudinally slidable along base plate 210 with seat plate rails 230 moving longitudinally along the stationary base plate rails 260. FIGS. 34 and 35 illustrate embodiments of base plate rails 260 and seat plate rails 230, respectively. As shown, the configurations of seat plate rails 230 and base plate rails 260 match each other. Longitudinal movement of seat plate 215 in relation to base plate 210 allows platform upper assembly 240, platform lower assembly 365, and energy attenuation system 205 to be positioned in different horizontal directions. Seat plate release pins 225 are inserted through a pin opening 360 of base plate rail 260 when matched with a pin opening 360 of seat plate rail 230 to prevent movement of seat plate 215 and lock seat plate 215 in place. The seat plate release pins 225 are inserted on opposing sides of base plate 210 and seat plate 215. In alternative embodiments (not illustrated), seat plate release pins 225 are inserted on the same side of base plate 210 and seat plate 215. In other alternative embodiments (not illustrated), only one seat plate release pin 225 is used or more than two seat plate release pins 225 are used. In some embodiments, base plate 210 includes base plate shim bars 220. An embodiment of base plate shim bar 220 is illustrated in FIG. 36. Without limitation, base plate shim bars 220 limit the amount of energy that is stored in base plate 210 in an improvised explosive device (IED) event by minimizing its deflection. FIG. 32 illustrates a perspective view of an embodiment of base plate 210.

In other embodiments as illustrated in FIGS. 26-28, ratchet platform 70 also includes ratchet platform attachment means 575. Ratchet platform attachment means 575 includes any means suitable for attaching ratchet platform 70 to seat assembly 10. In an embodiment as illustrated in FIGS. 26-28 and FIG. 37, ratchet platform attachment means 575 includes strap 235, strap retractor 245 and release hook 300. Strap retractor 245 is a device suitable for retracting a strap 235 and for allowing strap 235 to be pulled forth from strap retractor 245 and that also prevents extraction of strap 235 when a certain level of tension is applied. An example of a strap retractor 245 is a seat belt retractor used in automobiles. Strap 235 includes any suitable type of strap. For instance, in an embodiment, strap 235 includes a long narrow strip of pliant material. In alternative embodiments (not illustrated), strap 235 is a cable. In an embodiment, strap 235 passes through strap ring 310 before entering and after exiting strap retractor 245. Without limitation, strap ring 310 facilitates extraction and retraction of strap retractor 245. A release hook 300 is attached to the end of strap 235 opposite strap retractor 245. Release hook 300 includes any type of hook suitable for attaching to an object such as base strap attachment means 95. In some embodiments, release hook 300 is attached to seat 20 (i.e., base strap attachment means 95) after passing through attachment opening 410. Without limitation, such an attachment prevents unwanted upward movement of seat 20 (i.e., during a roll over) but allows desired movement of the individual to perform tasks. In an embodiment as illustrated, release hook 300 is a quick release hook with a swivel. In some embodiments, ratchet platform attachment means 575 includes release strap 295. Release strap 295 is attached to release hook 300, and a sufficient pulling force on release strap 295 releases release hook 300. In an embodiment, release strap 295 includes a visual 280. Visual 280 includes any means for increasing visibility of release strap 295. In an embodiment, visual 280 includes fluorescent material. Visual 280 is secured to release strap 295 by any suitable means such as by stitching 285. In an embodiment, release strap 295 also includes grip 290 at the end of release strap 295 opposite the end of release strap 295 attached to release hook 300. In an embodiment, ratchet platform attachment means 575 includes strap adjustment 305. Strap adjustment 305 includes any means suitable for attaching release hook 300 to strap 235 such as VELCRO, which is a registered trademark of Velcro Industries N.V.

In an embodiment as illustrated in FIGS. 26-28, strap retractor 245 is secured to platform base 385. In an embodiment in which ratchet platform 70 includes energy attenuation system 205, strap retractor 245 is secured to platform base 385 and energy attenuation system 205. In an embodiment (not illustrated), securing means such as bolts secure strap retractor 245 to platform base 385 and energy attenuation system 205. In such an embodiment, on the inside of energy attenuation system 205 are reinforcement strips through which the securing means (i.e., bolts) pass. Without limitation, the reinforcement strips facilitate securing of strap retractor 245 to platform base 385. For instance, the reinforcement straps prevent tension during a vehicle rollover from causing strap retractor 245 from separating from platform base 385 and energy attenuation system 205. In embodiments as illustrated, release hook 300 is passed through attachment opening 410.

In an embodiment as shown in FIGS. 1 and 26-27, ratchet platform 70 also includes ratchet platform attachment strap 250. An end of ratchet platform attachment strap 250 is secured to platform base 385. In an embodiment as illustrated, ratchet platform attachment strap 250 is secured to platform base 385 by strap receiving means 255. The other end of ratchet platform attachment strap 250 is attached to platform 415. Ratchet platform attachment strap 250 has sufficient tension to prevent unwanted extension of platform upper assembly 240. Without limitation, in an instance when the vehicle rolls over, the force of the roll over applies tension to platform upper assembly 240. Ratchet platform attachment strap 250 prevents the tension from causing unwanted extension of platform upper assembly 240.

It is to be understood that platform upper assembly 240 is not limited to platform 415, platform grating 375 and toe queue 370. In alternative embodiments (not illustrated), platform upper assembly 240 includes platform 415 and toe queue 370 or platform grating 375. In other alternative embodiments (not illustrated), platform upper assembly 240 includes platform 415 but does not include toe queue 370 and platform grating 375.

The vehicle in which soldier platform system 5 is secured may include any vehicle such as a truck, car, military vehicle, helicopter, air plane, and the like. In an embodiment, the vehicle is a military vehicle.

It is to be understood that soldier platform system 5 is not limited to soldiers but may be used for any type of individual.

Although the present invention and its advantages have been described in detail, it should be understood that various changes, substitutions and alterations may be made herein without departing from the spirit and scope of the invention as defined by the appended claims.

What is claimed is:

1. A soldier platform system in a vehicle, wherein the vehicle has an interior, and wherein the interior has walls, comprising:
    a seat assembly comprising a seat and straps, wherein the straps are attachable to at least one of the walls of the interior of the vehicle;
    a restraint harness belt, wherein the restraint harness belt is attached to the seat assembly;
    a ratchet platform comprising:
        a platform upper assembly;
        a platform lower assembly, wherein the platform lower assembly comprises a platform upper assembly actuator, wherein the platform upper assembly actuator comprises a pedal sub assembly; and
    ratchet platform attachment means comprising a ratchet platform attachment means strap, a ratchet platform attachment means strap retractor, and a release hook; wherein the ratchet platform attachment means attaches the seat assembly to the ratchet platform; wherein the ratchet platform attachment means is attached to the platform lower assembly; wherein the ratchet platform attachment means strap retractor is capable of retracting the ratchet platform attachment means strap, preventing extraction of the ratchet platform attachment means strap when a level of tension is applied, and also allows the ratchet platform attachment means strap to be pulled forth from the ratchet platform attachment means strap retractor; wherein the release hook attaches the ratchet platform means strap to the seat assembly; and wherein the release hook is capable of releasing the seat assembly from the ratchet platform.

2. The soldier platform system of claim 1, wherein the platform lower assembly further comprises a support column.

3. The soldier platform system of claim 2, wherein the support column comprises a pedal opening and an interior.

4. The soldier platform system of claim 3, wherein the pedal sub assembly comprises a pedal linkage.

5. The soldier platform system of claim 4, wherein the pedal linkage extends through the pedal opening, with a portion of the pedal linkage disposed in the interior.

6. The soldier platform system of claim 5, wherein the pedal sub assembly further comprises a pedal.

7. The soldier platform system of claim 6, wherein the pedal sub assembly further comprises a pedal pivot pin.

8. The soldier platform system of claim 7, wherein an end of the pedal pivot pin is attached to a pedal pivot support, and wherein an end of the pedal pivot pin opposing the end of the pedal pivot pin attached to the pedal pivot support is attached to another pedal pivot support.

9. The soldier platform system of claim 8, wherein the pedal pivot supports are disposed on opposing sides of the pedal opening.

10. The soldier platform system of claim 6, wherein the pedal linkage is attached to an upper linkage.

11. The soldier platform system of claim 10, wherein the upper linkage is disposed in the interior.

12. The soldier platform system of claim 10, wherein an end of the pedal linkage opposing the pedal is attached to the upper linkage.

13. The soldier platform system of claim 10, wherein the upper linkage and the pedal linkage are rotatable in relation to each other.

14. The soldier platform system of claim 10, wherein the upper linkage is attached to the support column.

15. The soldier platform system of claim 14, wherein the upper linkage is attached to the support column at an end of the upper linkage opposing an end of the upper linkage that is attached to the pedal linkage.

16. The soldier platform system of claim 10, wherein a ratchet pin extends through an end of the upper linkage.

17. The soldier platform system of claim 16, wherein the upper linkage comprises an upper linkage groove on an end of the upper linkage opposing the end of the upper linkage through which the ratchet pin extends.

18. The soldier platform system of claim 17, wherein an end of the pedal linkage is disposed in the upper linkage groove.

19. The soldier platform system of claim 1, wherein one or more torsion springs are attached to the pedal sub assembly.

20. The soldier platform system of claim 1, wherein the platform upper assembly is vertically adjustable.

\* \* \* \* \*